US011831661B2

(12) United States Patent
Lee et al.

(10) Patent No.: US 11,831,661 B2
(45) Date of Patent: Nov. 28, 2023

(54) MULTI-TIERED APPROACH TO PAYLOAD DETECTION FOR INCOMING COMMUNICATIONS

(71) Applicant: Abnormal Security Corporation, San Francisco, CA (US)

(72) Inventors: Yu Zhou Lee, San Francisco, CA (US); Micah J. Zirn, San Francisco, CA (US); Umut Gultepe, San Francisco, CA (US); Jeshua Alexis Bratman, San Francisco, CA (US); Michael Douglas Kralka, San Francisco, CA (US); Cheng-Lin Yeh, San Francisco, CA (US); Dmitry Chechik, San Francisco, CA (US); Sanjay Jeyakumar, San Francisco, CA (US)

(73) Assignee: Abnormal Security Corporation, San Francisco, CA (US)

( * ) Notice: Subject to any disclaimer, the term of this patent is extended or adjusted under 35 U.S.C. 154(b) by 0 days.

(21) Appl. No.: 17/831,335

(22) Filed: Jun. 2, 2022

(65) Prior Publication Data
US 2022/0394047 A1    Dec. 8, 2022

Related U.S. Application Data

(60) Provisional application No. 63/287,937, filed on Dec. 9, 2021, provisional application No. 63/196,603, filed on Jun. 3, 2021.

(51) Int. Cl.
| | | |
|---|---|---|
| H04L 9/40 | (2022.01) | |
| H04L 51/212 | (2022.01) | |
| H04L 51/08 | (2022.01) | |

(52) U.S. Cl.
CPC .......... *H04L 63/1416* (2013.01); *H04L 51/08* (2013.01); *H04L 51/212* (2022.05); *H04L 63/145* (2013.01); *H04L 63/20* (2013.01)

(58) Field of Classification Search
None
See application file for complete search history.

(56) References Cited

U.S. PATENT DOCUMENTS

| | | |
|---|---|---|
| 5,999,932 A | 12/1999 | Paul |
| 6,023,723 A | 2/2000 | Mccormick |
| (Continued) | | |

FOREIGN PATENT DOCUMENTS

| | | |
|---|---|---|
| CN | 107315954 | 11/2017 |

OTHER PUBLICATIONS

Barngrover, Adam, "Vendor Access Management with IGA", Saviynt Inc. Apr. 24, 2019 (Apr. 24, 2019) Retrieved on Apr. 17, 2021 (Apr. 17, 2021) from <https://saviynt.com/vendor-access-management-with-iga/> entire document, 2 pp.

(Continued)

*Primary Examiner* — Joseph P Hirl
*Assistant Examiner* — Hassan Saadoun
(74) *Attorney, Agent, or Firm* — Van Pelt, Yi & James LLP

(57) ABSTRACT

A plurality of features associated with a message are determined. At least one feature included in the plurality of features is associated with a payload of the message. A determination is made that supplemental analysis should be performed on the message. The determination is based at least in part on performing behavioral analysis using at least some of the features included in the plurality of features. Supplemental analysis is performed.

29 Claims, 11 Drawing Sheets

(56) References Cited

U.S. PATENT DOCUMENTS

| | | |
|---|---|---|
| 6,088,717 A | 7/2000 | Reed |
| 7,263,506 B2 | 8/2007 | Lee |
| 7,451,487 B2 | 11/2008 | Oliver |
| 7,610,344 B2 | 10/2009 | Mehr |
| 7,953,814 B1 | 5/2011 | Chasin |
| 8,112,484 B1 | 2/2012 | Sharma |
| 8,244,532 B1 | 8/2012 | Begeja |
| 8,566,938 B1 | 10/2013 | Prakash |
| 8,819,819 B1 | 8/2014 | Johnston |
| 8,935,788 B1 | 1/2015 | Diao |
| 8,943,142 B1* | 1/2015 | Simon .................. G06F 40/18 709/205 |
| 9,009,824 B1 | 4/2015 | Chen |
| 9,154,514 B1 | 10/2015 | Prakash |
| 9,213,827 B2 | 12/2015 | Li |
| 9,245,115 B1 | 1/2016 | Jakobsson |
| 9,245,225 B2 | 1/2016 | Winn |
| 9,264,418 B1 | 2/2016 | Crosley |
| 9,348,981 B1 | 5/2016 | Hearn |
| 9,473,437 B1 | 10/2016 | Jakobsson |
| 9,516,053 B1 | 12/2016 | Muddu |
| 9,537,880 B1 | 1/2017 | Jones |
| 9,571,512 B2 | 2/2017 | Ray |
| 9,686,308 B1 | 6/2017 | Srivastava |
| 9,756,007 B1 | 9/2017 | Stringhini |
| 9,774,626 B1 | 9/2017 | Himler |
| 9,781,152 B1 | 10/2017 | Mistratov |
| 9,847,973 B1 | 12/2017 | Jakobsson |
| 9,940,394 B1 | 4/2018 | Grant |
| 9,946,789 B1 | 4/2018 | Li |
| 9,954,805 B2 | 4/2018 | Nigam |
| 9,961,096 B1 | 5/2018 | Pierce |
| 9,967,268 B1 | 5/2018 | Hewitt |
| 10,015,182 B1 | 7/2018 | Shintre |
| 10,044,745 B1 | 8/2018 | Jones |
| 10,091,312 B1 | 10/2018 | Khanwalkar |
| 10,104,029 B1 | 10/2018 | Chambers |
| 10,129,194 B1 | 11/2018 | Jakobsson |
| 10,129,288 B1 | 11/2018 | Xie |
| 10,243,989 B1 | 3/2019 | Ding |
| 10,250,624 B2 | 4/2019 | Mixer |
| 10,277,628 B1* | 4/2019 | Jakobsson ............. H04L 51/212 |
| 10,305,836 B2* | 5/2019 | Tonegawa ............... H04L 51/18 |
| 10,362,057 B1 | 7/2019 | Wu |
| 10,397,272 B1 | 8/2019 | Bruss |
| 10,419,468 B2 | 9/2019 | Glatfelter |
| 10,523,609 B1* | 12/2019 | Subramanian .......... H04L 51/08 |
| 10,601,865 B1 | 3/2020 | Mesdaq |
| 10,616,272 B2 | 4/2020 | Chambers |
| 10,673,880 B1 | 6/2020 | Pratt |
| 10,721,195 B2 | 7/2020 | Jakobsson |
| 10,834,127 B1 | 11/2020 | Yeh |
| 10,911,489 B1 | 2/2021 | Chechik |
| 10,972,483 B2 | 4/2021 | Thomas |
| 10,972,485 B2 | 4/2021 | Ladnai |
| 11,019,076 B1 | 5/2021 | Jakobsson |
| 11,451,576 B2 | 9/2022 | Kao |
| 11,494,421 B1 | 11/2022 | Ghafourifar |
| 2002/0002520 A1 | 1/2002 | Gatto |
| 2002/0116463 A1 | 8/2002 | Hart |
| 2003/0204569 A1 | 10/2003 | Andrews |
| 2004/0030913 A1 | 2/2004 | Liang |
| 2004/0117450 A1 | 6/2004 | Campbell |
| 2004/0128355 A1 | 7/2004 | Chao |
| 2004/0215977 A1 | 10/2004 | Goodman |
| 2004/0260922 A1 | 12/2004 | Goodman |
| 2005/0039019 A1 | 2/2005 | Delany |
| 2005/0187934 A1 | 8/2005 | Motsinger |
| 2005/0198518 A1 | 9/2005 | Kogan |
| 2006/0036698 A1 | 2/2006 | Hebert |
| 2006/0053203 A1 | 3/2006 | Mijatovic |
| 2006/0191012 A1 | 8/2006 | Banzhof |
| 2006/0253581 A1 | 11/2006 | Dixon |
| 2007/0074169 A1 | 3/2007 | Chess |
| 2007/0276851 A1 | 11/2007 | Friedlander |
| 2008/0005249 A1 | 1/2008 | Hart |
| 2008/0086532 A1 | 4/2008 | Cunningham |
| 2008/0114684 A1 | 5/2008 | Foster |
| 2008/0201401 A1 | 8/2008 | Pugh |
| 2009/0037350 A1 | 2/2009 | Rudat |
| 2009/0132490 A1 | 5/2009 | Okraglik |
| 2010/0115040 A1 | 5/2010 | Sargent |
| 2010/0211641 A1 | 8/2010 | Yih |
| 2010/0318614 A1 | 12/2010 | Sager |
| 2011/0173142 A1 | 7/2011 | Dasgupta |
| 2011/0179126 A1 | 7/2011 | Wetherell |
| 2011/0213869 A1 | 9/2011 | Korsunsky |
| 2011/0214157 A1 | 9/2011 | Korsunsky |
| 2011/0231510 A1 | 9/2011 | Korsunsky |
| 2011/0231564 A1 | 9/2011 | Korsunsky |
| 2011/0238855 A1 | 9/2011 | Korsunsky |
| 2012/0028606 A1 | 2/2012 | Bobotek |
| 2012/0042017 A1* | 2/2012 | Fried .................... H04L 51/212 709/206 |
| 2012/0110672 A1 | 5/2012 | Judge |
| 2012/0137367 A1 | 5/2012 | Dupont |
| 2012/0233662 A1 | 9/2012 | Scott-Cowley |
| 2012/0278887 A1 | 11/2012 | Vitaldevara |
| 2012/0290712 A1 | 11/2012 | Walter |
| 2012/0297484 A1 | 11/2012 | Srivastava |
| 2013/0041955 A1 | 2/2013 | Chasin |
| 2013/0086180 A1 | 4/2013 | Midgen |
| 2013/0086261 A1 | 4/2013 | Lim |
| 2013/0097709 A1 | 4/2013 | Basavapatna |
| 2013/0167207 A1 | 6/2013 | Davis |
| 2013/0191759 A1 | 7/2013 | Bhogal |
| 2014/0013441 A1 | 1/2014 | Hencke |
| 2014/0032589 A1 | 1/2014 | Styler |
| 2014/0181223 A1 | 6/2014 | Homsany |
| 2014/0325662 A1 | 10/2014 | Foster |
| 2014/0365303 A1 | 12/2014 | Vaithilingam |
| 2014/0379825 A1 | 12/2014 | Speier |
| 2014/0380478 A1 | 12/2014 | Canning |
| 2015/0026027 A1 | 1/2015 | Priess |
| 2015/0128274 A1 | 5/2015 | Giokas |
| 2015/0143456 A1 | 5/2015 | Raleigh |
| 2015/0161609 A1 | 6/2015 | Christner |
| 2015/0161611 A1 | 6/2015 | Duke |
| 2015/0228004 A1 | 8/2015 | Bednarek |
| 2015/0234831 A1 | 8/2015 | Prasanna Kumar |
| 2015/0237068 A1 | 8/2015 | Sandke |
| 2015/0295942 A1 | 10/2015 | Tao |
| 2015/0295945 A1 | 10/2015 | Canzanese, Jr. |
| 2015/0319157 A1 | 11/2015 | Sherman |
| 2015/0339477 A1 | 11/2015 | Abrams |
| 2016/0014151 A1 | 1/2016 | Prakash |
| 2016/0036829 A1 | 2/2016 | Sadeh-Koniecpol |
| 2016/0057167 A1 | 2/2016 | Bach |
| 2016/0063277 A1 | 3/2016 | Vu |
| 2016/0156654 A1 | 6/2016 | Chasin |
| 2016/0227367 A1 | 8/2016 | Alsehly |
| 2016/0253598 A1 | 9/2016 | Yamada |
| 2016/0262128 A1 | 9/2016 | Hailpern |
| 2016/0301705 A1 | 10/2016 | Higbee |
| 2016/0306812 A1 | 10/2016 | Mchenry |
| 2016/0321243 A1 | 11/2016 | Walia |
| 2016/0328526 A1 | 11/2016 | Park |
| 2016/0344770 A1 | 11/2016 | Verma |
| 2016/0380936 A1 | 12/2016 | Gunasekara |
| 2017/0041296 A1 | 2/2017 | Ford |
| 2017/0048273 A1 | 2/2017 | Bach |
| 2017/0098219 A1 | 4/2017 | Peram |
| 2017/0111506 A1 | 4/2017 | Strong |
| 2017/0186112 A1 | 6/2017 | Polapala |
| 2017/0214701 A1 | 7/2017 | Hasan |
| 2017/0222960 A1 | 8/2017 | Agarwal |
| 2017/0223046 A1 | 8/2017 | Singh |
| 2017/0230323 A1 | 8/2017 | Jakobsson |
| 2017/0230403 A1 | 8/2017 | Kennedy |
| 2017/0237754 A1 | 8/2017 | Todorovic |
| 2017/0237776 A1 | 8/2017 | Higbee |
| 2017/0251006 A1 | 8/2017 | Larosa |
| 2017/0289191 A1 | 10/2017 | Thioux |
| 2017/0324767 A1 | 11/2017 | Srivastava |

(56) References Cited

U.S. PATENT DOCUMENTS

| | | |
|---|---|---|
| 2017/0346853 A1 | 11/2017 | Wyatt |
| 2018/0026926 A1 | 1/2018 | Nigam |
| 2018/0027006 A1 | 1/2018 | Zimmermann |
| 2018/0084003 A1 | 3/2018 | Uriel |
| 2018/0084013 A1 | 3/2018 | Dalton |
| 2018/0091453 A1 | 3/2018 | Jakobsson |
| 2018/0091476 A1 | 3/2018 | Jakobsson |
| 2018/0159808 A1 | 6/2018 | Pal |
| 2018/0189347 A1 | 7/2018 | Ghafourifar |
| 2018/0196942 A1 | 7/2018 | Kashyap |
| 2018/0219888 A1 | 8/2018 | Apostolopoulos |
| 2018/0227324 A1 | 8/2018 | Chambers |
| 2018/0295146 A1 | 10/2018 | Kovega |
| 2018/0324297 A1 | 11/2018 | Kent |
| 2018/0375814 A1 | 12/2018 | Hart |
| 2019/0014143 A1 | 1/2019 | Syme |
| 2019/0026461 A1 | 1/2019 | Cidon |
| 2019/0028509 A1 | 1/2019 | Cidon |
| 2019/0052655 A1 | 2/2019 | Benishti |
| 2019/0065748 A1 | 2/2019 | Foster |
| 2019/0068616 A1 | 2/2019 | Woods |
| 2019/0081983 A1 | 3/2019 | Teal |
| 2019/0087428 A1 | 3/2019 | Crudele |
| 2019/0089711 A1 | 3/2019 | Faulkner |
| 2019/0104154 A1 | 4/2019 | Kumar |
| 2019/0109863 A1 | 4/2019 | Traore |
| 2019/0141183 A1 | 5/2019 | Chandrasekaran |
| 2019/0166161 A1 | 5/2019 | Anand |
| 2019/0166162 A1 | 5/2019 | Anand |
| 2019/0190929 A1 | 6/2019 | Thomas |
| 2019/0190936 A1 | 6/2019 | Thomas |
| 2019/0199745 A1 | 6/2019 | Jakobsson |
| 2019/0205511 A1 | 7/2019 | Zhan |
| 2019/0222606 A1 | 7/2019 | Schweighauser |
| 2019/0238571 A1 | 8/2019 | Adir |
| 2019/0260780 A1 | 8/2019 | Matthew |
| 2019/0311121 A1 | 10/2019 | Martin |
| 2019/0319905 A1 | 10/2019 | Baggett |
| 2019/0319987 A1 | 10/2019 | Levy |
| 2019/0349400 A1 | 11/2019 | Bruss |
| 2019/0384911 A1 | 12/2019 | Caspi |
| 2020/0007502 A1 | 1/2020 | Everton |
| 2020/0021609 A1 | 1/2020 | Kuppanna |
| 2020/0044851 A1 | 2/2020 | Everson |
| 2020/0053111 A1 | 2/2020 | Jakobsson |
| 2020/0053120 A1 | 2/2020 | Wilcox |
| 2020/0068031 A1 | 2/2020 | Kursun |
| 2020/0074078 A1 | 3/2020 | Saxe |
| 2020/0076825 A1 | 3/2020 | Vallur |
| 2020/0125725 A1 | 4/2020 | Petersen |
| 2020/0127962 A1 | 4/2020 | Chuhadar |
| 2020/0162483 A1 | 5/2020 | Farhady |
| 2020/0204572 A1 | 6/2020 | Jeyakumar |
| 2020/0287936 A1 | 9/2020 | Nguyen |
| 2020/0344251 A1 | 10/2020 | Jeyakumar |
| 2020/0358804 A1 | 11/2020 | Crabtree |
| 2020/0374251 A1 | 11/2020 | Warshaw |
| 2020/0389486 A1 | 12/2020 | Jeyakumar |
| 2020/0396190 A1 | 12/2020 | Pickman |
| 2020/0396258 A1 | 12/2020 | Jeyakumar |
| 2020/0412767 A1 | 12/2020 | Crabtree |
| 2021/0021612 A1 | 1/2021 | Higbee |
| 2021/0058395 A1 | 2/2021 | Jakobsson |
| 2021/0091962 A1 | 3/2021 | Finke |
| 2021/0092154 A1 | 3/2021 | Kumar |
| 2021/0168161 A1* | 6/2021 | Dunn .................... G06N 20/00 |
| 2021/0240836 A1 | 8/2021 | Hazony |
| 2021/0272066 A1 | 9/2021 | Bratman |
| 2021/0295179 A1 | 9/2021 | Eyal Altman |
| 2021/0329035 A1 | 10/2021 | Jeyakumar |
| 2021/0336983 A1 | 10/2021 | Zhou |
| 2021/0352093 A1 | 11/2021 | Hassanzadeh |
| 2021/0360027 A1 | 11/2021 | Boyer |
| 2021/0374679 A1 | 12/2021 | Bratman |
| 2021/0374680 A1 | 12/2021 | Bratman |
| 2021/0385181 A1* | 12/2021 | Parkinson ............... H04L 51/48 |
| 2022/0021700 A1 | 1/2022 | Devlin |
| 2022/0141252 A1 | 5/2022 | Shi |

OTHER PUBLICATIONS

Information Security Media Group, "Multi-Channel Fraud: A Defense Plan", Retrieved on Apr. 18, 2021 (Apr. 18, 2021) from <https://www.bankInfosecurity.com/Interviews/multi-channel-fraud-defense-plan-i-1799>, Feb. 20, 2013, 9 pages.

International Search Report and Written Opinion dated Apr. 24, 2020 of PCT/US2019/067279 (14 pages).

Mahajan, et al., "Finding HTML Presentation Failures Using Image Comparison Techniques", ASE'14, pp. 91-98 (Year: 2014).

Mont, Marco Casassa, "Towards accountable management of identity and privacy: Sticky policies and enforceable tracing services", 14th International Workshop on Database and Expert Systems Applications, 2003. Proceedings. IEEE, 2003. Mar. 19, 2003 (Mar. 19, 2003), Retrieved on Apr. 17, 2021 (Apr. 17, 2021) from <https://ieeexplore.ieee.org/abstract/documenV1232051> entire document, Mar. 19, 2003, 17 pp.

Proofpoint (Proofpoint Closed-Loop Email Analysis and Response, Aug. 2018, 2 pages) (Year: 2018).

* cited by examiner

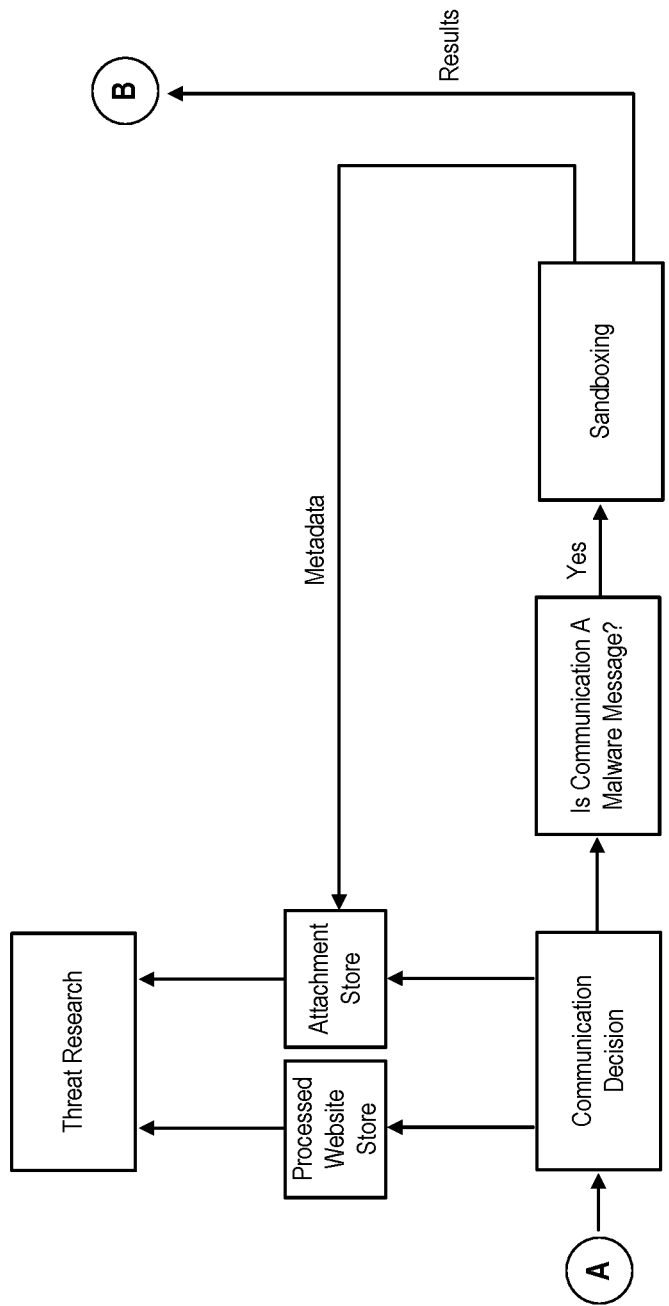
FIGURE 6, CONT.

MULTI-TIERED APPROACH TO PAYLOAD DETECTION FOR INCOMING COMMUNICATIONS

CROSS REFERENCE TO OTHER APPLICATIONS

This application claims priority to U.S. Provisional Patent Application No. 63/196,603 entitled MULTI-TIERED APPROACH TO PAYLOAD DETECTION FOR INCOMING COMMUNICATIONS filed Jun. 3, 2021, which is incorporated herein by reference for all purposes. This application also claims priority to U.S. Provisional Patent Application No. 63/287,937 entitled TOPIC INSIGHTS filed Dec. 9, 2021, which is also incorporated herein by reference for all purposes.

BACKGROUND OF THE INVENTION

Employees of enterprise organizations receive a variety of types of electronic messages. Some of these messages may be wanted (e.g., legitimate communications made among employees of a given enterprise, or made between employees and entities outside of the enterprise). Others of these messages may be malicious (e.g., attempting to compromise computing infrastructure or defraud the recipient) or otherwise unwanted. Unfortunately, differentiating between various types of messages can be a daunting task, particularly as the number of electronic messages an individual receives on a given day increases. Accordingly, there is an ongoing need for improvements to techniques for managing electronic messages.

BRIEF DESCRIPTION OF THE DRAWINGS

Various embodiments of the invention are disclosed in the following detailed description and the accompanying drawings.

DETAILED DESCRIPTION

Figure 1:
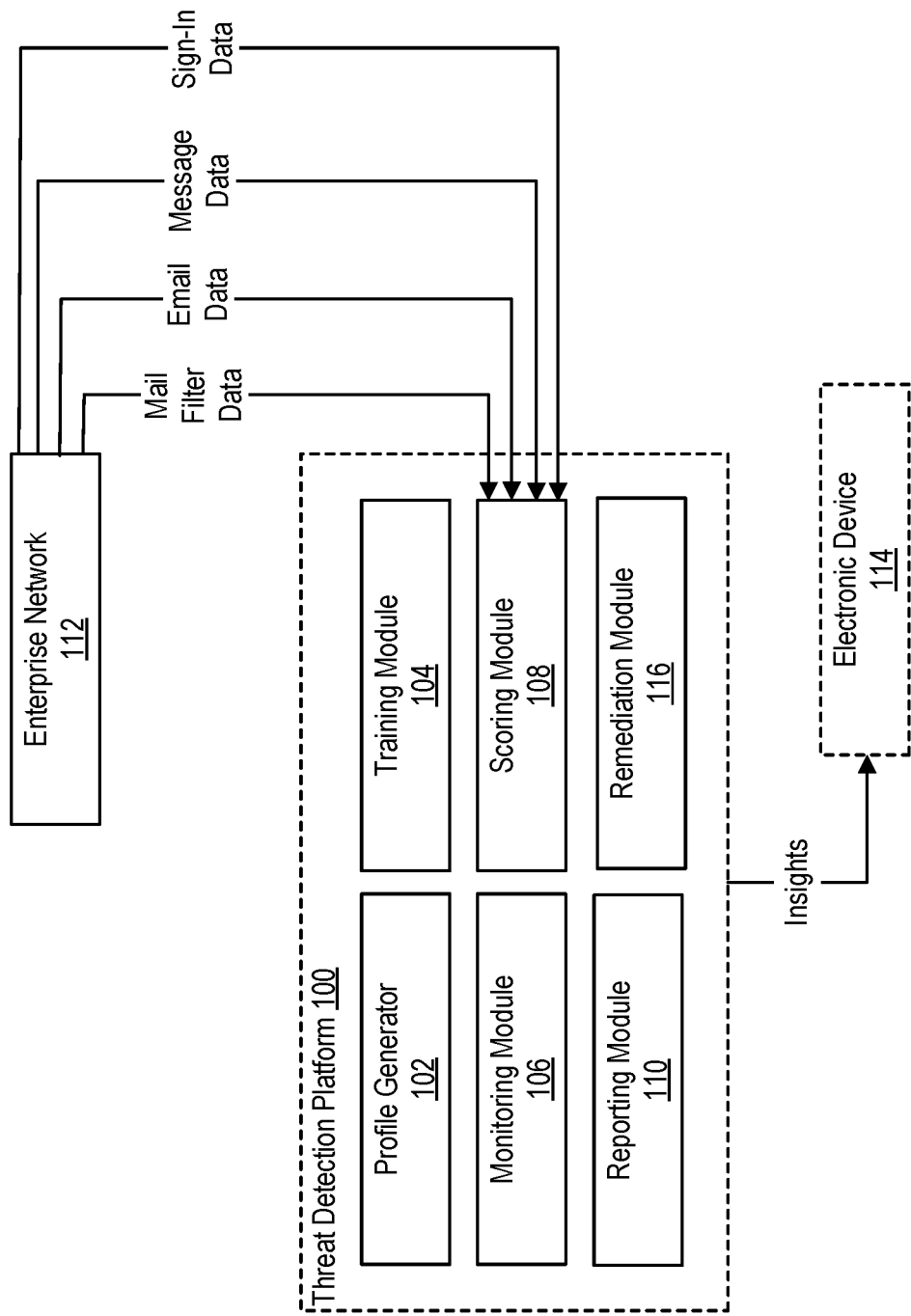
FIG. 1 depicts an example of a threat detection platform that is configured to examine the digital conduct of accounts associated with employees to detect threats to the security of an enterprise.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Introduction

Email has become vastly more sophisticated with the Internet connecting millions of individuals in real time. These technological advancements have incentivized malicious actors (also referred to as "attackers") to send malicious emails in greater numbers than ever before. Because email represents the primary communication channel for most enterprises (also referred to as "businesses," "companies," or "organizations"), it is a primary point of entry for attackers.

Enterprises have traditionally employed secure email gateways (SEGs) to protect on-premise email. A SEG is an appliance—implemented via hardware, firmware, or software—that monitors incoming and outgoing emails to prevent delivery of harmful content. SEGs have historically been fairly successful in filtering spam, blocking malware, and thwarting phishing attacks. However, SEGs rely on defined rules for filtering malicious emails. As such, SEGs not only cannot detect novel attacks that have not been observed before, but also are slow in remediating those attacks and preventing future attacks.

Many communications that are representative of attacks on enterprises include malicious content in the payload. For example, an email addressed to an employee may contain a link or attachment with which the employee is directed to interact. These payloads are used in an effort to induce recipients to take actions coaxed by attackers.

Some of the most common goals of attacks include (i) installing malware, (ii) inducing the input of credentials, and (iii) obtaining sensitive information, such as personal information (e.g., credentials) or financial information (e.g., bank account information). To achieve these goals, the payload of a communication can be tailored accordingly. Some of the most common payloads include (i) attachments that contain malware, (ii) links that, when selected, either directly or indirectly lead to download of malware, (iii) fictitious websites that prompt entry of sensitive information, and (iv) links that, when selected, either directly or indirectly lead to fictitious websites that prompt entry of sensitive information.

Conventional security products—like SEGs—have become better at discovering these payloads over time. Unfortunately, in response and to circumvent these security products, attackers have begun hiding payloads to make it more difficult, if not impossible, for conventional security products to automatically detect these payloads. For example, an attacker may obfuscate a payload by hiding malware that is only accessible through several links that are "chained" together. Often, one or more of these links go through trusted websites like https://docs.google.com. As another example, an attacker may obfuscate a payload by hiding a link to a phishing website inside an attachment. Normally, the attachment is in a format, such as Portable Document Format (PDF), that otherwise appears normal to the recipient of the communication. As another example, an attacker may obfuscate a payload by hiding malware behind an automated program that is intended to serve as a verification mechanism. For instance, malware may be hidden on a fictitious website that requires successful completion of a CAPTCHA or another challenge-response test to access.

The speed with which attacks change tactics for hiding payloads, as well as the variety of tactics for hiding payloads, make it difficult to discover malicious communications in a consistent manner. There exists an ongoing need for security products that are able to reliably determine the intent of communications, including through analysis of payloads. Embodiments of such security products are described herein (e.g., with reference to threat detection platform 100). There are several aspects of payload detection that are addressed using embodiments of techniques described herein. Those aspects include:

Payload Resolution: Given a communication, threat detection platform 100 is able to find whatever payloads are involved. This can include resolving links, crawling those links, finding additional links (also referred to as "embedded links"), examining files to which those links lead, etc.

Malware Detection: Threat detection platform 100 is able to detect that a communication which is representative of a social engineering attack is attempting to install malware through a direct attachment, link, or another mechanism. Accomplishing this can include both a thorough understanding of content and of behavioral norms.

Malware Analysis: Given the bytes of a potential malware file, threat detection platform 100 is able to identify attributes of that file when executed.

Phishing Detection: Threat detection platform 100 is able to detect that a communication which is representative of a social engineering attack is attempting to solicit the input of sensitive information, such as credentials or bank account information. Accomplishing this can include both a thorough understanding of content and behavioral norms.

Phishing Analysis: Given the contents of a website or attachment, threat detection platform 100 is able to identify whether an attacker is attempting to coax the recipient into revealing sensitive information.

Introduced here are approaches to rapidly examining payloads of communications to establish the threat posed by those communications. As further discussed below, threat detection platform 100 is responsible for determining threats posed by communications. To accomplish this, threat detection platform 100 applies one or more computer-implemented models (or simply "models") to each communication to quantify and qualify the risk posed to the security of an enterprise in near real time. These models can examine the context and content of communications to establish whether any of those communications are representative of, for example, phishing.

In order to determine the threat posed by communications, in various embodiments, threat detection platform 100 employs a multi-tiered approach to detect and then analyze the payloads of those communications. At a high level, an example multi-tiered approach involves:

Employing behavioral and content analysis to identify communications that are attempting to deliver a payload;

Examining links (e.g., with a link crawler) to establish a path to where the payload ultimately exists;

Examining attachments (e.g., with a file processor);

Identifying attributes of (i) the payload or (ii) the path to the payload; and

Determining the threat posed by each communication based on the attributes in combination with insights gained through the behavioral and content analysis.

Such an approach to detecting threats ensures that determinations need not be made solely based on analysis of the payload. Instead, threat detection platform 100 can consider the payload in the context of the behavior of the sender or recipient and the content of the communication.

One aspect of the multi-tiered approach is that unique insights can be surfaced through the combination of payload detection and behavioral analysis. Understanding whether the behavior of the sender and/or recipient of a communication is abnormal provides greater insight into whether the communication poses a threat. Accordingly, threat detection platform 100 need not discover incontrovertible evidence—a "smoking gun"—like a malicious link or fictitious website in the payload of a communication in order to flag it as a threat. Instead, in at least some situations, threat detection platform 100 is able to infer that a threat exists responsive to a discovery that the sender is, for example, "merely" redirecting the recipient to an unusual file or website as determined based on behavioral signals derived from past communications involving the sender and/or the recipient. This multi-tiered approach provides more flexibility in detecting payload attacks than relying on known indicators of maliciousness because attackers are constantly adjusting the tactics and content of attacks.

For the purpose of illustration, the multi-tiered approach is generally described herein in the context of detecting and then examining the payloads of communications determined to be representative of malware attacks. However, the multi-tiered approach is similarly applicable to other types of attacks. For example, the multi-tiered approach can also be employed to detect and then examine the payloads of communications determined to be representative of phishing attacks. Moreover, the multi-tiered approach is applicable to various types of payloads. For example, instead of a downloadable zip file that contains malware, a communication may contain a link that leads—either directly or indirectly—to a fake website that prompts the recipient to enter credentials. Threat detection platform 100 can perform analysis of the HyperText Markup Language (HTML) code of the fake website to determine that it is malicious.

While embodiments may be described in the context of computer-executable instructions, aspects of the technology described herein can be implemented via hardware, firmware, or software. As an example, aspects of the threat detection platform can be embodied as instruction sets that are executable by a computer program that offers support for discovering, classifying, and then remediating threats to the security of an enterprise.

References in this description to "an embodiment" or "one embodiment" mean that the feature, function, structure, or characteristic being described is included in at least one embodiment of the technology. Occurrences of such phrases do not necessarily refer to the same embodiment, nor are they necessarily referring to alternative embodiments that are mutually exclusive of one another.

Unless the context clearly requires otherwise, the terms "comprise," "comprising," and "comprised of" are to be construed in an inclusive sense rather than an exclusive or exhaustive sense (i.e., in the sense of "including but not limited to"). The term "based on" is also to be construed in an inclusive sense rather than an exclusive or exhaustive sense. Thus, unless otherwise noted, the term "based on" is intended to mean "based at least in part on."

The terms "connected," "coupled," and/or variants thereof are intended to include any connection or coupling between two or more elements, either direct or indirect. The connection/coupling can be physical, logical, or a combination thereof. For example, objects may be electrically or communicatively coupled to one another despite not sharing a physical connection.

The term "module" refers to software components, firmware components, or hardware components. Modules are typically functional components that generate one or more outputs based on one or more inputs. As an example, a computer program may include multiple modules responsible for completing different tasks or a single module responsible for completing all tasks. Unless otherwise specified, an example way of implementing a module referred to herein is as a set of one or more python scripts which may make use of various publicly available libraries, toolkits, etc.

When used in reference to a list of multiple items, the term "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open ended.

II. Threat Detection Platform

FIG. 1 depicts an example of a threat detection platform that is configured to examine the digital conduct of accounts associated with employees to detect threats to the security of an enterprise. "Accounts" are digital profiles with which employees can engage in digital activities. These digital profiles are typically used to perform activities such as exchanging emails and messages, and thus may also be referred to as "email accounts" or "messaging accounts" herein. "Digital conduct" refers to the digital activities that are performed with those accounts. Examples of digital activities include transmitting and receiving communications; creating, modifying, and deleting filters to be applied to incoming communications; initiating sign-in activities; and the like. Examples of communications include emails and messages. As shown in FIG. 1, threat detection platform 100 includes a profile generator 102, a training module 104, a monitoring module 106, a scoring module 108, a reporting module 110, and a remediation module 116. Some embodiments of threat detection platform 100 include a subset of these components, while other embodiments of the threat detection platform 100 include additional components that are not shown in FIG. 1.

At a high level, threat detection platform 100 can acquire data related to digital conduct of accounts associated with employees and then determine, based on an analysis of the data, how to handle security threats in a targeted manner. Examples of such data include information related to emails, messages, mail filters, and sign-in activities. As further discussed below, these data are not necessarily obtained from the same source. As an example, data related to emails can be acquired from an email service (e.g., Microsoft Office 365) while data related to messages may be acquired from a messaging service (e.g., Slack). Threat detection platform 100 can identify security threats based on an analysis of incoming emails (e.g., the content of the body, the email address of the sender, etc.), metadata accompanying the incoming emails (e.g., information regarding the sender, recipient, origin, time of transmission, etc.), attachments, links, and/or other suitable data.

Threat detection platform 100 can be implemented, partially or entirely, within an enterprise network 112, a remote computing environment (e.g., through which the data regarding digital conduct is routed for analysis), a gateway, or another suitable location, or combinations thereof. The remote computing environment can belong to, or be managed by, the enterprise or another entity. In some embodiments, threat detection platform 100 is integrated into the enterprise's email system (e.g., at a secure email gateway (SEG)) as part of an inline deployment. In other embodiments, threat detection platform 100 is integrated into the enterprise's email system via an application programming interface (API) such as the Microsoft Outlook API. In such embodiments, the threat detection platform 100 can obtain data via the API. Threat detection platform 100 can thus supplement and/or supplant other security products employed by the enterprise.

In some embodiments, threat detection platform 100 is maintained by a threat service (also referred to herein as a "security service") that has access to multiple enterprises' data. In this scenario, threat detection platform 100 can route data that is, for example, related to incoming emails to a computing environment managed by the security service. An example of such a computing environment is as one or more instances on Amazon Web Services (AWS). Threat detection platform 100 can maintain one or more databases for each enterprise it services that include, for example, organizational charts (and/or other user/group identifiers/memberships, indicating information such as "Alice is a member of the Engineering group" and "Bob is a member of the Marketing group"), attribute baselines, communication patterns, etc. Additionally or alternatively, threat detection platform 100 can maintain federated databases that are shared among multiple entities. Examples of federated databases include databases specifying vendors and/or individuals who have been deemed fraudulent, domains from which incoming emails determined to represent security threats originated, etc. The security service can maintain different instances of threat detection platform 100 for different enterprises, or the security service may maintain a single instance of threat detection platform 100 for multiple enterprises, as applicable. The data hosted in these instances can be obfuscated, encrypted, hashed, depersonalized (e.g., by removing personal identifying information), or otherwise secured or secreted as applicable. Accordingly, in various embodiments, each instance of threat detection platform 100 is able to access/process data related to the accounts associated with the corresponding enterprise(s).

In some embodiments, threat detection platform 100 is maintained by the enterprise whose accounts are being monitored—either remotely or on premises. In this scenario, all relevant data is hosted by the enterprise itself, and any information to be shared across multiple enterprises (if applicable) can be transmitted to a computing system that is maintained by the security service or a third party, as applicable.

As shown in FIG. 1, profile generator 102, training module 104, monitoring module 106, scoring module 108, reporting module 110, and remediation module 116 can be integral parts of the threat detection platform 100. Alternatively, these components can be implemented individually, or in various combinations, while operating "alongside" threat detection platform 100. For example, reporting module 110 can be implemented in a remote computing environment to which the threat detection platform 100 is communicatively connected across a network. As mentioned above, threat detection platform 100 can be implemented by a security service on behalf of an enterprise or the enterprise itself. In some embodiments, aspects of threat detection platform 100 are provided by a web-accessible computer program operating on a computer server or a distributed computing system. For example, an individual can interface with threat detection platform 100 through a web browser that is executing on an electronic computing device (also referred to herein as an "electronic device" or "computing device") 114.

Enterprise network 112 can be a mobile network, wired network, wireless network, or some other communication network (or multiple of any/all of such networks) maintained by the enterprise or an operator on behalf of the enterprise. As noted above, the enterprise can use a security service to examine communications (among other things) to discover potential security threats. The enterprise may grant permission to the security service to monitor the enterprise network 112 by examining emails (e.g., incoming emails and/or outgoing emails) and then handling those emails that represent security threats. For example, threat detection platform 100 can be permitted to remediate threats posed by those emails (e.g., by using an API made available by an email service provider such as a cloud-based email service provider to move or delete such messages), or the threat detection platform 100 may be permitted to surface notifications regarding the threats posed by those emails, or combinations thereof. In some embodiments, the enterprise further grants permission to the security service to obtain data regarding other digital activities involving the enterprise (and, more specifically, employees of the enterprise) in order to build a profile that specifies communication patterns, behavioral traits, normal context of emails, normal content of emails, etc. For example, threat detection platform 100 may identify the filters that have been created and/or destroyed by each employee to infer whether any significant variations in behavior have occurred. Such filters may comprise rules manually specified by the user (e.g., by the user explicitly interacting with tools made available by an email service) and/or may also be inferred based on users' interactions with their mail (e.g., by obtaining from the email service log data indicating which messages the user has moved from an inbox to a folder, or vice versa). As another example, threat detection platform 100 may examine the emails or messages received by a given employee to establish the characteristics of normal communications (and thus be able to identify abnormal communications).

Threat detection platform 100 can manage one or more databases in which data can be stored. Examples of such data include enterprise data (e.g., email data, message data, sign-in data, and mail filter data), remediation policies, communication patterns, behavioral traits, etc. The data stored in the database(s) can be determined by threat detection platform 100 (e.g., learned from data available on enterprise network 112), provided by the enterprise, or retrieved from an external database (e.g., associated with LinkedIn, Microsoft Office 365, or G Suite) as applicable. Threat detection platform 100 can also store outputs produced by the various modules, including machine- and human-readable information regarding insights into threats and any remediation actions that were taken.

As shown in FIG. 1, threat detection platform 100 includes a profile generator 102 that is responsible for generating one or more profiles for the enterprise. For example, profile generator 102 can generate a separate profile for each account associated with an employee of the enterprise based on sign-in data, message data, email data, and/or mail filter data, etc. Additionally or alternatively, profiles can be generated for business groups, organizational groups, or the enterprise as a whole. By examining data obtained from enterprise network 112, profile generator 102 can discover organizational information (e.g., employees, titles, and hierarchy), employee behavioral traits (e.g., based on historical emails, messages, and historical mail filters), normal content of incoming or outgoing emails, behavioral patterns (e.g., when each employee normally logs in), communication patterns (e.g., who each employee communicates with internally and externally, when each employee normally communicates, etc.), etc. This information can be populated into the profiles so that each profile can be used as a baseline for what constitutes normal activity by the corresponding account (or group of accounts).

An example profile includes a number of behavioral traits associated with a given corresponding account. For example, profile generator 102 can determine various behavioral traits based on sign-in data, message data, email data, and/or mail filter data obtained from enterprise network 112 or another source (e.g., a collaboration suite via an API). Email data can include information on the senders of past emails received by a given email account, content of those past emails, frequency of those past emails, temporal patterns of those past emails, topics of those past emails, geographical locations from which those past emails originated, formatting characteristics (e.g., usage of HTML, fonts, styles, etc.), and more. Profile generator 102 can use the aforementioned information to build a profile for each email account that represents a model of normal behavior of the corresponding employee. As further discussed below, the profiles can be helpful in identifying the digital activities and communications that indicate a security threat may exist.

Monitoring module 106 is responsible for monitoring communications (e.g., messages and emails) handled by the enterprise network 112. These communications can include incoming emails (e.g., external and internal emails) received by accounts associated with employees of the enterprise, outgoing emails (e.g., external and internal emails) transmitted by those accounts, and messages exchanged between those accounts. In some embodiments, monitoring module 106 is able to monitor incoming emails in near real time so that appropriate action can be taken, in a timely fashion, if a malicious email is discovered. For example, if an incoming email is determined to be representative of a phishing attack (e.g., based on an output produced by scoring module 108), the incoming email can be prevented from reaching its intended destination by the monitoring module 106 or another applicable component or set of components. In some embodiments, monitoring module 106 is able to monitor communications only upon threat detection platform 100 being granted permission by the enterprise (and thus given access to enterprise network 112).

Scoring module 108 is responsible for examining digital activities and communications to determine the likelihood that a security threat exists. For example, scoring module 108 can examine each incoming email to determine how its characteristics compare to past emails sent by the sender and/or received by the intended recipient. In various embodiments, scoring module 108 may determine whether characteristics such as timing, formatting, and location of origination (e.g., in terms of sender email address or geographical location) match a pattern of past emails that have been determined to be non-malicious. For example, scoring module 108 may determine that an email is likely to be malicious if the sender email address ("support-xyz@gmail.com") differs from an email address ("John.Doe@CompanyABC.com") that is known to be associated with the alleged sender ("John Doe"). As another example, scoring module 108 may determine that an account may have been compromised if the account performs a sign-in activity that is impossible or improbable given its most recent sign-in activity (e.g., the user logs in from Germany ten minutes after having logged in from California, or a user that typically accesses email from 9 am-5 pm on weekdays begins accessing email on weekends at 3 am).

Scoring module 108 can make use of heuristics, rules, neural networks, or other trained machine learning (ML) approaches such as decision trees (e.g., gradient-boosted decision trees), logistic regression, linear regression, or other appropriate techniques. Scoring module 108 can output discrete outputs or continuous outputs, such as a probability metric (e.g., specifying the likelihood that an incoming email is malicious), a binary output (e.g., malicious or not malicious), or a sub-classification (e.g., specifying the type of malicious email). Further, scoring module 108 can rank or otherwise generate a prioritized list of the top features, facets, or combinations thereof, that result in a particular message being identified as posing a security threat. In various embodiments, scoring module 108 executes a topic inference module. The topic inference module can be used to identify topics of digital communications. Assume, for example, that scoring module 108 is tasked with quantifying risk posed by an incoming email. In that situation, the topic inference module may identify one or more topics based on an analysis of the incoming email, its metadata, or information derived by the scoring module. These topics may be helpful in conveying the risk and relevance of the incoming email and for other purposes.

Reporting module 110 is responsible for reporting insights derived from outputs produced by scoring module 108 in various embodiments (e.g., as a notification summarizing types of threats discovered or other applicable output). For example, reporting module 110 can provide a summary of the threats discovered by scoring module 108 to an electronic device 114. Electronic device 114 may be managed by the employee associated with the account under examination, an individual associated with the enterprise (e.g., a member of the information technology (IT) department), or an individual associated with a security service, etc. Reporting module 110 can surface these insights in a human-readable format for display on an interface accessible via the electronic device 114. Such insights can be used to improve the overall security position of the enterprise, by providing specific, concrete reasons why particular communications are problematic to security personnel (or other appropriate individuals, such as end users).

Remediation module 116 can perform one or more remediation actions in response to scoring module 108 determining that an incoming email is likely representative of a threat. The types of remediation that can be taken can be based on the nature of the threat (e.g., its severity, the type of threat posed, the user(s) implicated in the threat, etc.), policies implemented by the enterprise, etc. Such policies can be predefined or dynamically generated based on inference, analysis, and/or the data obtained from enterprise network 112. Additionally or alternatively, remediation action(s) may be based on the outputs produced by the models employed by the various modules. Examples of remediation actions include transferring suspect emails to another folder such as a quarantine folder, generating an alert (e.g., to an administrator or to the user), etc.

Various embodiments of threat detection platform 100 include a training module 104 that operates to train the models employed by other modules. As an example, training module 104 can train the models applied by scoring module 108 to the sign-in data, message data, email data, and/or mail filter data, etc., by feeding training data into those models. Example training data includes emails that have been labeled as malicious or non-malicious, policies related to attributes of emails (e.g., specifying that emails originating from certain domains should not be considered malicious), etc. The training data can be employee-, group-, enterprise-, industry-, or nationality-, specific so that the model(s) are able to perform personalized analysis. In some embodiments, the training data ingested by the model(s) includes emails that are known to be representative of malicious emails sent as part of an attack campaign. These emails may have been labeled as such during a training process, or these emails may have been labeled as such by other employees.

Training module 104 can implement a retraining pipeline (also referred to herein as a "pipeline") in order to protect against novel threats as further discussed below. At a high level, the pipeline corresponds to a series of steps that, when executed by the training module 104, cause the models employed by the scoring module 108 to be retrained. By consistently training models using up-to-date information, the threat detection platform 100 can protect against novel threats that would otherwise escape detection.

III. Techniques for Deriving Topics for Messages

Threat detection platform 100 can characterize digital communications along several dimensions. These dimensions are also referred to herein as "facets." Facets are useful in several respects. As a first example, the facets can be used by an individual to resolve the types of attacks employed against an enterprise, as well as to create datasets that are useful for training, introspection, etc. The individual may be a member of the IT department of the enterprise, or the individual may be employed by a security service responsible for monitoring the security of the enterprise. As a second example, facets can be used as a way to divide data internally to allow teams to work on specific subsections of email attacks. These teams can then improve detection of the email attacks by training models on subset data and improve scoring module 108. As a third example, the facets can be provided as input to security operations center (SOC) tools that may be used to filter data, generate reports, etc. An incoming email may be associated with one or more of the following example facets:

- Attack Type: This facet indicates whether the incoming email is indicative of business email compromise (BEC), phishing, spoofing, spam, etc. It is derived based on combinations of the following five facets.
- Attack Strategy: This facet indicates whether the incoming email qualifies as name impersonation, internal account compromise, external account compromise, a spoofed message, a message originating from an unknown sender, etc.
- Impersonated Party: This facet indicates who, if anyone, the incoming email intended to impersonate. Examples include very important persons (VIPs) such as c-suite executives, assistants, employees, contractors, partners, vendors, internal automated systems, external automated systems, or no one in particular.
- Attacked Party: This facet indicates who was the target of the attack carried out by the incoming email. Examples include VIPs, assistants, employees, and external recipients such as vendors, contractors, and the like. In some embodiments, this facet may further identify the group or department under attack (e.g., the accounting department, human resources department, etc.).
- Attack Goal: This facet indicates the goal of the attack carried out by the incoming email. Examples include invoice fraud, payment fraud, credential theft, ransom, malware, gift card fraud, and the like.
- Attack Vector: This facet indicates how the attack is actually carried out, for example, by specifying whether the risk is posed by text, links, or attachments included in the incoming email.

These above example facets can be used as the "building blocks" for describing the nature of communication-based attacks, for example, to enterprises. Together, these facets can be used to characterize an attack along predetermined dimensions. For example, incoming emails can be characterized using one, some, or all of the above facets. A layer of configuration can be used over facets to define, establish, or otherwise determine the nature of an attack. For example, if threat detection platform 100 determines that, for an incoming email, (i) the attack goal is invoice fraud and (ii) the impersonated party is a known partner, then the threat detection platform can define the incoming email as an instance of "external invoice fraud." Consequently, these facets can flow into other functionality provided by threat detection platform 100 such as: (i) internal metrics indicating how the threat detection platform is managing different attack types, (ii) reporting to enterprises, and (iii) filtering for different attack types.

The above facets can be augmented to more completely/accurately represent the nature of a malicious communication. In particular, information regarding the topics mentioned in such communications can be used. Assume, for example, that several incoming emails related to different merger and acquisition scenarios are determined to be representative of phishing attacks. While each of the incoming emails have the same attack goal—that is, scamming the recipients—each incoming email is rather specific in its content. In such a situation, it would be useful to provide information about the actual content of the incoming emails to those individuals responsible for managing the threat posed by those incoming emails. Furthermore, some scenarios call for a more fluid approach to characterizing threats that allows threat detection platform 100 to more quickly surface new attack types. Historically, it has been difficult to measure, characterize, and report new attack types until sufficient training data regarding those new attack types has been provided to the appropriate models. Note that characterizing threats along a greater number of dimensions also lessens the likelihood of different communications being characterized as similar or identical. As an example, an email inquiring about invoices and an email requesting a quote may both be classified as instances of payment fraud if those emails are characterized along a limited number of dimensions. While those emails may have the same attack goal, the content of those messages is different (and that may be useful information in determining how to discover or remediate future instances of similar emails). An example of two messages sharing the same topic but two different attack goals is a shared topic of "invoice," with the first message having an attack goal of credential phishing ("click here to sign into your account and make a payment or update your payment information") and the second message having an attack goal of payment fraud ("your account is overdue, please send a check to pay your outstanding balance"). An example of two messages sharing the same attack goal but two different topics is a shared attack goal of "credential phishing," with the first message having a topic of "debit account detail updates" ("set up your new direct debit by clicking here") and the second message having a topic of "COVID-19" ("due to COVID-19 we have a new policy, click here to access our client portal and find out more").

Described herein are techniques for characterizing digital communications along a type of dimension referred to as "topics." Upon receiving a digital communication, threat detection platform 100 can apply one or more models in order to establish one or more topics of the digital communication. The term "topic" refers to a subject that is mentioned (either directly or indirectly) in content of the digital communication. As with the facets mentioned above, a given digital communication can be associated with multiple topics. Various combinations of topics, if present in a given message, can also be assigned/associated with more human meaningful descriptions (e.g., that can then be used to describe the message content instead of/in addition to each of the individual topics).

Topics can be derived by threat detection platform 100 regardless of whether the digital communication is deemed to be representative of an attack or not. In the event that the threat detection platform determines a digital communication is representative of an attack, the threat detection platform can generate and then surface a report that specifies an attack goal and topic(s) of the digital communication. Together, these pieces of information allow greater insight to be gained by the individual responsible for reviewing the report into the actual threat posed by the digital communication.

Figure 2A:
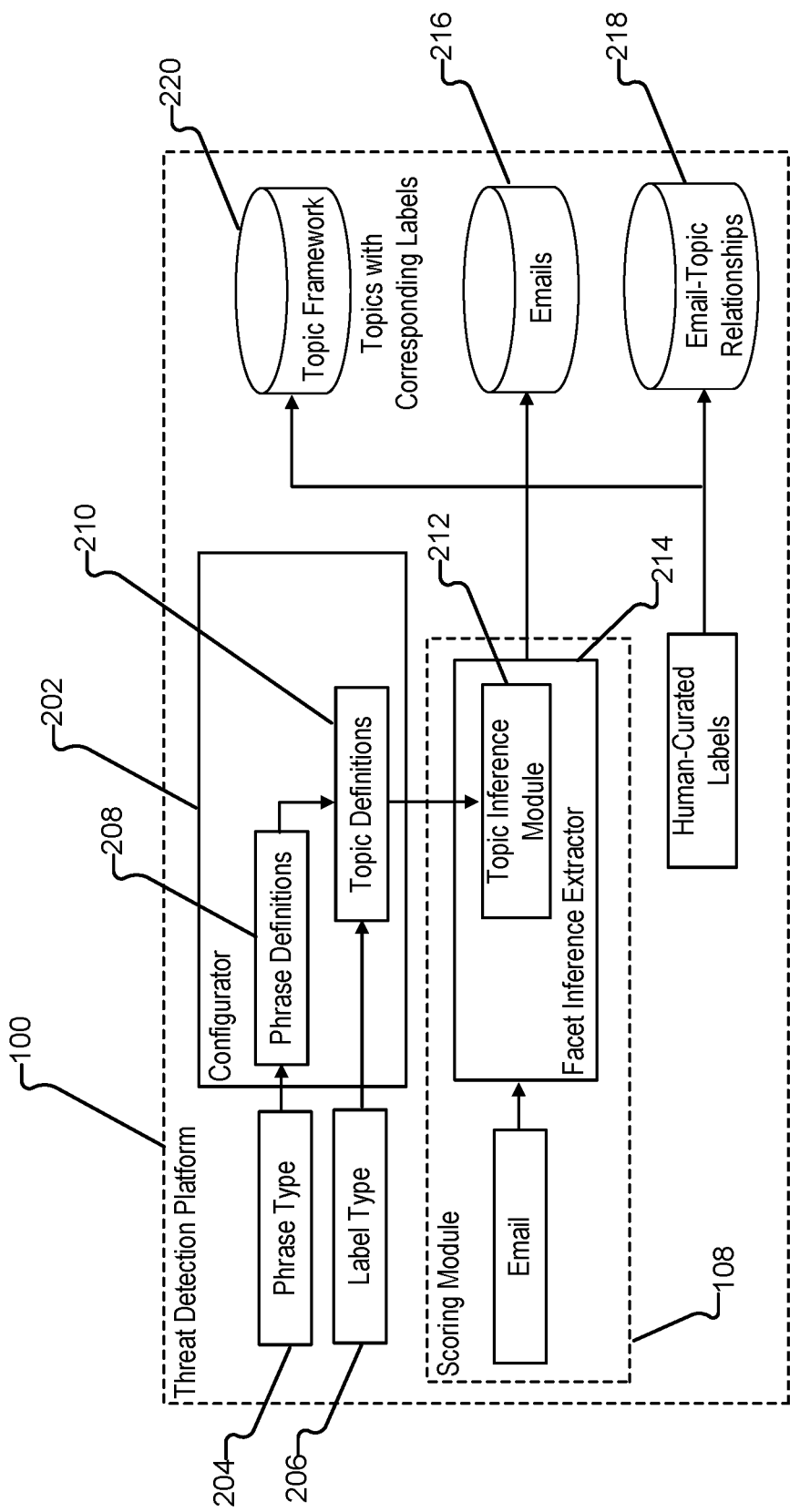
FIG. 2A illustrates an example of how topics of a digital communication can be discovered.

FIG. 2A illustrates an example of how topics of a digital communication can be discovered. As further discussed below, topics are designed to be fluid, and thus can be as expansive or specific as desired. Some enterprises may wish for more detailed information regarding the subjects discussed in malicious emails (e.g., "mergers and acquisitions" vs. "IPOs" vs. "bankruptcy"), in which case more topics may be available for classifying emails. Other enterprises may wish for less detailed information regarding the subjects discussed in malicious emails (e.g., "financial"), in which case fewer topics may be available for classifying emails. Further, enterprises can customize topics of particular relevance/importance to them (e.g., an engineering firm defining a set of topics around research and development vs. a shipping company defining a set of topics around transit, supply chains, etc.), instead of/in addition to topics of broad applicability (e.g., invoices). As applicable, enterprises can provide examples of labeled messages to threat detection platform 100 so that custom models/rules for identifying topics in accordance with those labels can be built/deployed. If needed, a larger data set can be constructed, e.g., using techniques such as nearest neighbor, text augmentation, etc. In various embodiments, topics are hierarchical/multi-class, e.g., with several different subtopics/related topics grouped together (e.g., using multinomial prediction).

In an example implementation, a topic is: (i) a potential subject of text included in an email, (ii) inferable by a human and machine, and (iii) independent of malicious intent. Accordingly, topics can be defined for all emails examined by the threat detection platform, irrespective of whether those emails are representative of attacks. Note that, in some embodiments, topics are defined with sufficient granularity that a given email is labeled as pertaining to multiple topics. This can be done to increase the likelihood that different emails with similar attack goals, such as those mentioned above, are distinguishable from one another.

To create a new topic, the topic is added to configurator 202 by an administrator (e.g., of threat detection platform 100). As shown in FIG. 2A, phrase types (204) and label types (206) may initially be provided to configurator 202 as input. The phrase types can be used by configurator 202 to generate phrase definitions (208), and the label types and phrase definitions can be used by configurator 202 to generate topic definitions (210), mapping topics to different phrase definitions and locations. Topics defined within configurator 202 can then be persisted through to other components and/or layers of threat detection platform 100. As an example, topic definitions 210 can be provided to a topic inference module 212 of a facet inference extractor 214. As shown in FIG. 2A, in some embodiments, facet inference extractor 214 is executed by a real-time scoring module (e.g., an embodiment of scoring module 108) that is configured to quantify the risk posed by incoming emails as discussed above. Topic inference module 212 is configured to infer, based on outputs produced by scoring module 108, one or more appropriate topics for the email. In some embodiments, a given email will have two sets of topics associated with it by threat detection platform 100. The first set of topics corresponds to topics inferred by threat detection platform 100. The second set of topics corresponds to topics explicitly defined or curated by a user of the threat detection platform (e.g., an analyst or administrator of threat detection platform 100, or a representative of an enterprise).

Applicable topics are associated with a given email, e.g., in an appropriate storage location. For example, topic inference module 212 can append labels that are representative of the topics to the email itself, e.g., by using an API provided by an email provider to edit the message (e.g., stored within email store 216) to include the topics (e.g., as one or more X-headers or other metadata). As another example, topic inference module 212 can populate a data structure with information regarding the labels. This data structure can be stored in a database in which email-topic relationships are formalized (e.g., database 218).

In an example of how threat detection platform 100 can be used, suppose a particular type of attack makes use of a malicious email that discusses a merger and acquisition scenario. Configurator 202 can be used to create an appropriate topic so that similar emails can be identified in the future. In particular, configurator 202 creates an appropriate label (e.g., "merger&acquisition" or "M&A") for the topic and then associates with that label, a set of phrases (e.g., "merger and acquisition," "merger/acquisition," "tender offer," "purchase of assets," etc.) that can be used (e.g., as filters) to identify messages to be associated with the label. The topic definition (comprising a label and corresponding phrases) can then be provided to other portions of threat detection platform 100, such as a data object usable by topic inference module 212 (and, e.g., stored in topic framework database 220).

New topics can be automatically learned by/added to threat detection platform 100 based on an analysis of incoming emails and/or outgoing emails. Additionally or alternatively, individuals (e.g., an administrator of threat detection platform 100) can be permitted to manually create topics (e.g., by accessing an administrative console provided by threat detection platform 100). Any human-labeled topics can be altered or deleted by threat detection platform 100 as applicable, based on, for example, whether the manually added topics are actually present in emails (i.e., do any messages match the topic), whether those manually added topics align or overlap with existing topics, etc.

The attack goal facet attempts to characterize an end goal of a given email. As such, the attack goal facet has malicious intent associated with it. Conversely, the topic facet refers to the subjects that are raised in, or related to, the content of an email or other communication (without regard to maliciousness). Table I includes examples of emails with corresponding topics and attack goals.

TABLE I

Examples of emails and corresponding topics and attack goals.

| Email Description | Possible Topic | Possible Attack Goal |
|---|---|---|
| Credential theft message in the context of file sharing a link to an invoice | File Sharing, Invoice | Credential Theft |
| Fraud message in the context of external invoice | Bank Account Information, Call to Action/Engagement, Invoice Payment | Invoice Fraud |
| Merger and Acquisition Scam | Mergers and Acquisition | Scam |
| Cryptocurrency Engage Message | Call to Action/Engagement, Cryptocurrency | Engage |

TABLE I-continued

Examples of emails and corresponding topics and attack goals.

| Email Description | Possible Topic | Possible Attack Goal |
|---|---|---|
| Reconnaissance Message | None | Spam |
| Payment Fraud Message that uses COVID-19 as Pretense | COVID-19, Request for Quote (RFQ) | Payment Fraud |

As can be seen in Table I, it is possible for topics and attack goals to overlap in some instances. For each email, threat detection platform 100 may introduce a many-to-many relationship between the email and the topic labels in which a topic can be associated with more than one email and an email can be associated with more than one topic. Such an approach allows the threat detection platform to support several possible queries, including:

The ability to filter emails by topic or combination of topics;
The ability to count the number of emails associated with a given topic; and
The ability to modify the topics associated with an email, as well as create labels for those topics.

Tables II-IV illustrate various examples of schemas that can be used by embodiments of threat detection platform 100 to associate emails with topics (e.g., in database 218).

TABLE II

Example schema for topics.

| Column Name | Data Type | Column Metadata |
|---|---|---|
| Topic_ID | Integer | Primary Key |
| Topic_Name | str/varchar(255) | Indexed, unique, fixed |
| Date_Created | Date, Time | |
| Topic_Display_Name | str/varchar(255) | How topic is shown to user |

TABLE III

Example schema for storing human-confirmed topics.

| Column Name | Data Type | Column Metadata |
|---|---|---|
| Topic_ID | Integer | Primary Key |
| Message_ID | Integer | Foreign Key |
| Human_Labeled | Boolean | |
| Date_Created | Date, Time | |

TABLE IV

Example schema for storing inferences for measurement.

| Column Name | Data Type | Column Metadata |
|---|---|---|
| Topic_ID | Integer | Primary Key |
| Messag_ID | Integer | Foreign Key |
| Date_Created | Date, Time | |

In some embodiments, threat detection platform 100 uses a domain specific language (DSL) to match against messages and their attributes. The DSL allows for the dynamic addition of different rules to assign messages topics, based on static features of the message (e.g., does it contain particular pre-defined phrases) or more dynamic features (e.g., using one or more models to score a message and derive topic information from the score(s)). One benefit of the lightweight nature of topic specification is that time-sensitive topics can be readily added to threat detection platform 100. As an example, attackers often make use of current/world events to lend legitimacy to their attacks (e.g., an attacker referencing a recent fire or other natural disaster as a reason that an email recipient should take an action, such as logging into a payment system). Such topics can efficiently be added to threat detection platform 100 to help identify attacks.

Below are examples of topics and corresponding DSL to identify when a given message matches a topic:

Example Topic: Cryptocurrency

```
"topic_cryptocurrency": [{
  "sec:HAS_BITCOIN_ADDRESS": true
},
  {"sec:HAS_BTC_RANSOMWARE_LINGO":true},
  {"feat_attr:CRYPTO_TOPIC_MODEL/gt":0.7}
]
```

The above DSL states that a message can be classified as having a "cryptocurrency" topic if any of the following is true: (1) it includes a bitcoin address, (2) it uses commonly found bitcoin ransomware expressions, or (3) a trained cryptocurrency topic model scores the content higher than 0.7.

Example Topic: Document Sharing

```
"topic_document_sharing": [
  {
    "sec:SUBJECT_HAS_DOCUMENT_SHARING_VOCAB": true,
    "feat_attr:DOCUMENT_SHARE_TOPIC_MODEL/gt":0.9
  },
  {
    "sec:BODY_HAS_DOCUMENT_SHARING_VOCAB": true,
    "feat_attr:DOCUMENT_SHARE_MODEL/gt":0.8
  }
]
```

The above DSL states that a message can be classified as having a "document sharing" topic if either of the following is true: (1) it has document sharing vocabulary in its subject line and the topic model gives it a score of higher than 0.9, or (2) it has a document sharing vocabulary in its body and the topic model gives it a score of higher than 0.8.

Figure 2B:
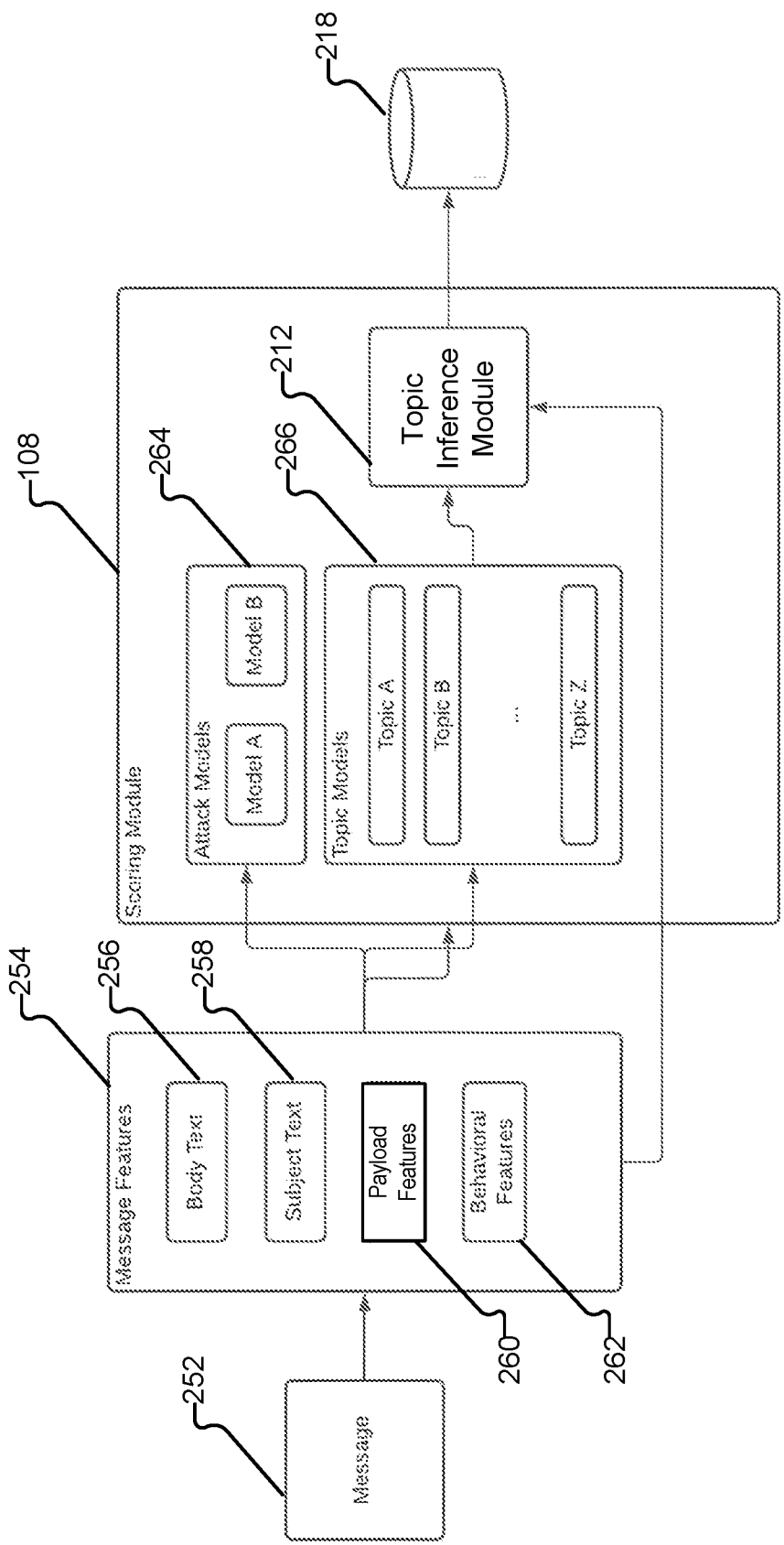
FIG. 2B illustrates an example of a message being processed by a scoring module.

FIG. 2B illustrates an example of a message being processed by a scoring module. As shown, message 252 (e.g., an email message retrieved by threat detection platform 100 from an email provider) has various features 254 (e.g., a body text 256, a subject text 258, payload features 260, and behavioral features 262) that are extracted by threat detection platform 100 and provided to scoring module 108.

Scoring module 108 includes a variety of attack models 264 (e.g., assessing whether a particular message is likely to be a phishing attack or a payment fraud attack), and topic models 266 (e.g., assessing whether a particular message discusses a corresponding topic). The extracted features are consumed by both the attack models and the topic models. In various embodiments, scoring module 108 (and subcomponents thereof) is implemented using a set of python scripts. As previously discussed, topic inference module 212 infers one or more topics to associate with message 252 and stores the message/topic(s) mapping in database 218. As applicable, if the topics assigned by topic inference module 212 are determined to be incorrect (e.g., as reported by an end user/message recipient), they can be changed (e.g., by an analyst) and any such mislabeled messages can be used to retrain topic models 266. In various embodiments, attack models 264 include one or more models related to payloads. A first example of such a model is an attachment text model which can be used to determine whether text included in a payload is potentially harmful (e.g., an attachment includes language referencing a ransomware attack). A second example of such a model is a web page model which can be used to determine whether a link included in a message is directly (or indirectly) potentially harmful. A third example of such a model is an attachment model which can be used to determine whether the attachment includes a malicious mechanism (e.g., an Excel document with problematic macros as contrasted with a plain text document or simple Microsoft Word document that does not contain any links).

IV. Techniques for Detecting and Analyzing Payloads of Communications

As discussed above, attackers often mask attacks by embedding malicious content—like malware and fictitious websites—in the payloads of communications delivered to employees of enterprises. In various embodiments, to identify these malicious communications, threat detection platform 100 employs a multi-tiered approach in which behavioral understanding is leveraged to lessen or avoid processing of payloads.

Figure 3:
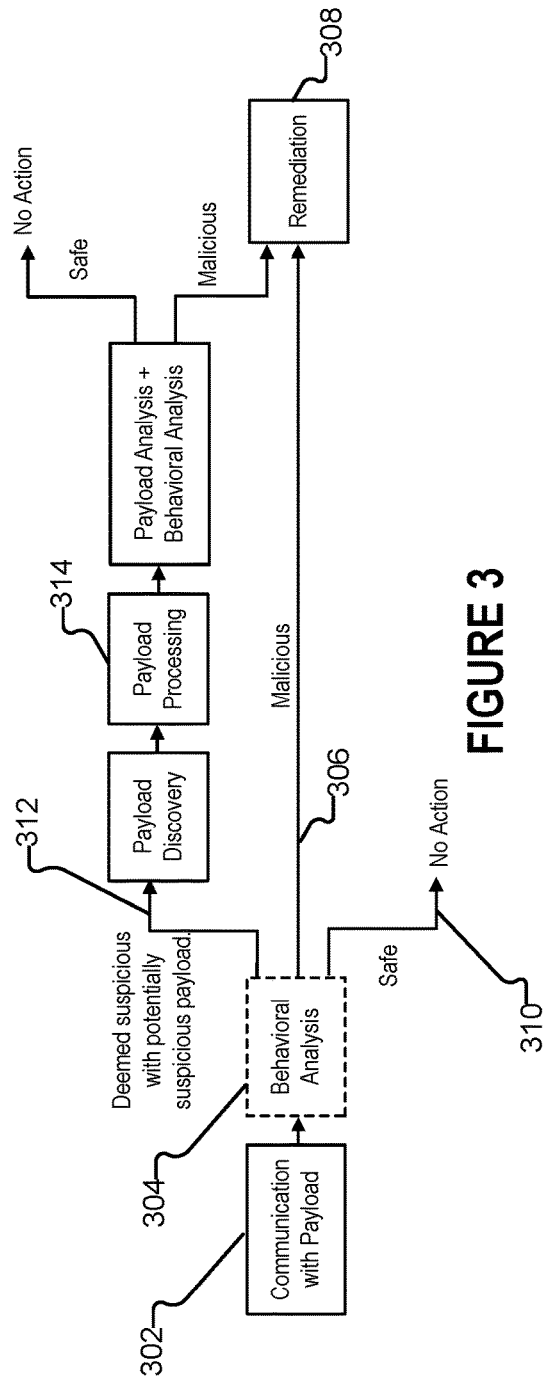
FIG. 3 includes a high-level illustration of a multi-tiered approach to establishing a threat posed by a communication with a payload.

FIG. 3 includes a high-level illustration of a multi-tiered approach to establishing a threat posed by a communication with a payload (302). In some embodiments, threat detection platform 100 initially attempts to make a determination regarding the threat posed by the communication based on behavioral analysis only (304). Specifically, threat detection platform 100 can try to ascertain whether the communication is sufficiently abnormal from a behavioral perspective to be classified as potentially risky without accessing the contents of the payload (306). This step can rely on outputs produced by models (e.g., those employed by scoring module 108) that relate to (i) content of the communication or (ii) behavior or identity of the sender or recipient.

If threat detection platform 100 determines that the communication is malicious, then no further processing may be needed. Threat detection platform 100 can remediate (308) the communication, for example, by preventing the communication from reaching its intended destination or informing an individual (e.g., a member of the IT department) of the threat. Similarly, if threat detection platform 100 definitively determines that the communication is not malicious, then no further processing may be needed (310). Threat detection platform 100 can allow the communication to reach its intended destination.

However, there are also scenarios where threat detection platform 100 is unsure of the threat posed by the communication (312). Assume, for example, that output(s) produced by model(s) applied by threat detection platform 100 to a communication indicate some suspicious behavior. As examples, the sender may be "rare" (i.e., has not previously sent the recipient a message, or very rarely sends the recipient messages), the sender may be discussing an atypical topic (e.g., a sender attempting to discuss invoices with a member of the engineering group instead of the finance group), or the sender may be using an atypical (for that sender) file transfer mechanism (e.g., suddenly attaching files instead of sending links to Google docs or vice versa). In such scenarios, threat detection platform 100 can process the payload of the communication (314) so as to definitively establish risk posed by the communication. This additional processing is referred to herein as "supplemental processing" that is performed by threat detection platform 100 on top of the normal processing of each incoming communication. Examples of payloads include links and attachments.

Figure 4:
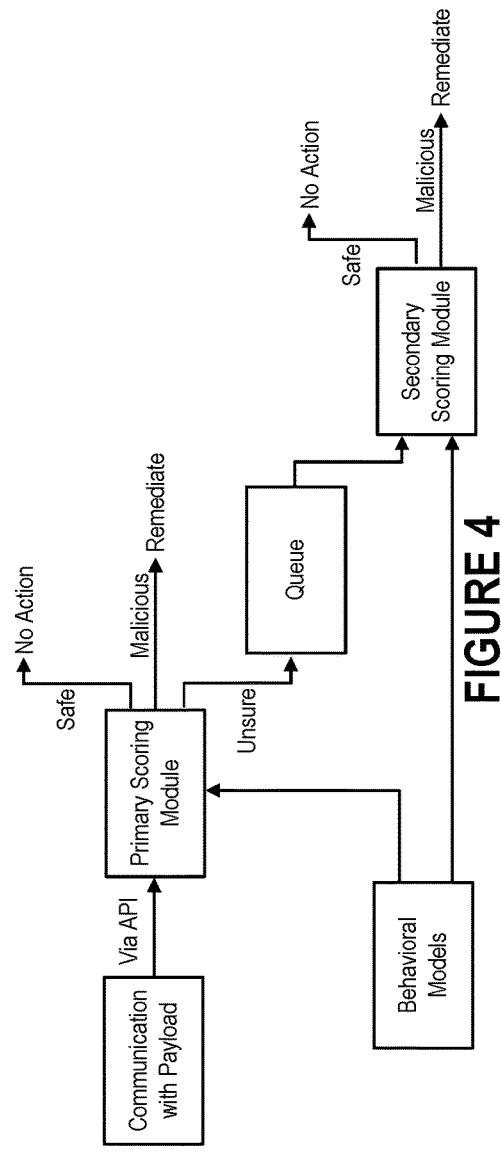
FIG. 4 includes a flow diagram of a process for making decisions regarding a queue of communications for which it has been determined that supplemental processing should be performed.

FIG. 4 includes a flow diagram of a process for making decisions regarding a queue of communications for which it has been determined that supplemental processing should be performed. This process can be performed by a primary scoring module (e.g., scoring module 108) or a secondary scoring module that is separately executable by threat detection platform 100. The secondary scoring module (also referred to as a "secondary scorer" or "near-real-time scorer") is able to process communications relatively quickly (e.g., within several seconds). However, this queue can potentially be overrun since the time needed by the secondary scoring module to analyze payloads can potentially exceed the time needed by the primary scoring module to examine the content and context of communications.

The primary and secondary scoring modules can consider the same behavioral information and insights surfaced by modules; however, the secondary scoring module may have access to more information based on the additional work done to examine the payload. This multifaceted process for determining the threat posed by communications allows threat detection platform 100 to more confidently (and accurately) assess risk. Behavioral analysis remains a part of the risk determination process, though supplementing this analysis with information gained through examination of payloads can be helpful in knowing whether those "toss up" communications are malicious or non-malicious.

Traditionally, security products have focused on deeply analyzing payloads in order to determine the threat posed by the corresponding communications. However, this "siloed" approach to determining risk ignores behavioral signals that may be necessary to understand whether a given communication represents an attack. In addition, these behavioral signals can be helpful in providing confidence in the determination that is ultimately made regarding whether the communication represents an attack.

The multi-tiered approaches described herein yield more flexibility because as soon as threat detection platform 100 has enough information to make a decision, that decision can be made (and appropriate actions can be taken). Threat detection platform 100 need not find incontrovertible evidence of maliciousness (or, as applicable, benignness). Instead, it can be sufficient for threat detection platform 100 to know that a communication (i) contains a link to a file download (or has an attachment) and (ii) has at least one behavioral signal that indicates a high likelihood of being an attack. Features from payload analysis (e.g., that a landing page has language about passwords or that an attachment includes macros) can be crossed with behavioral signals (e.g., that a message recipient has never received email from the sender) and content (as applicable) to make decisions.

Figure 5:
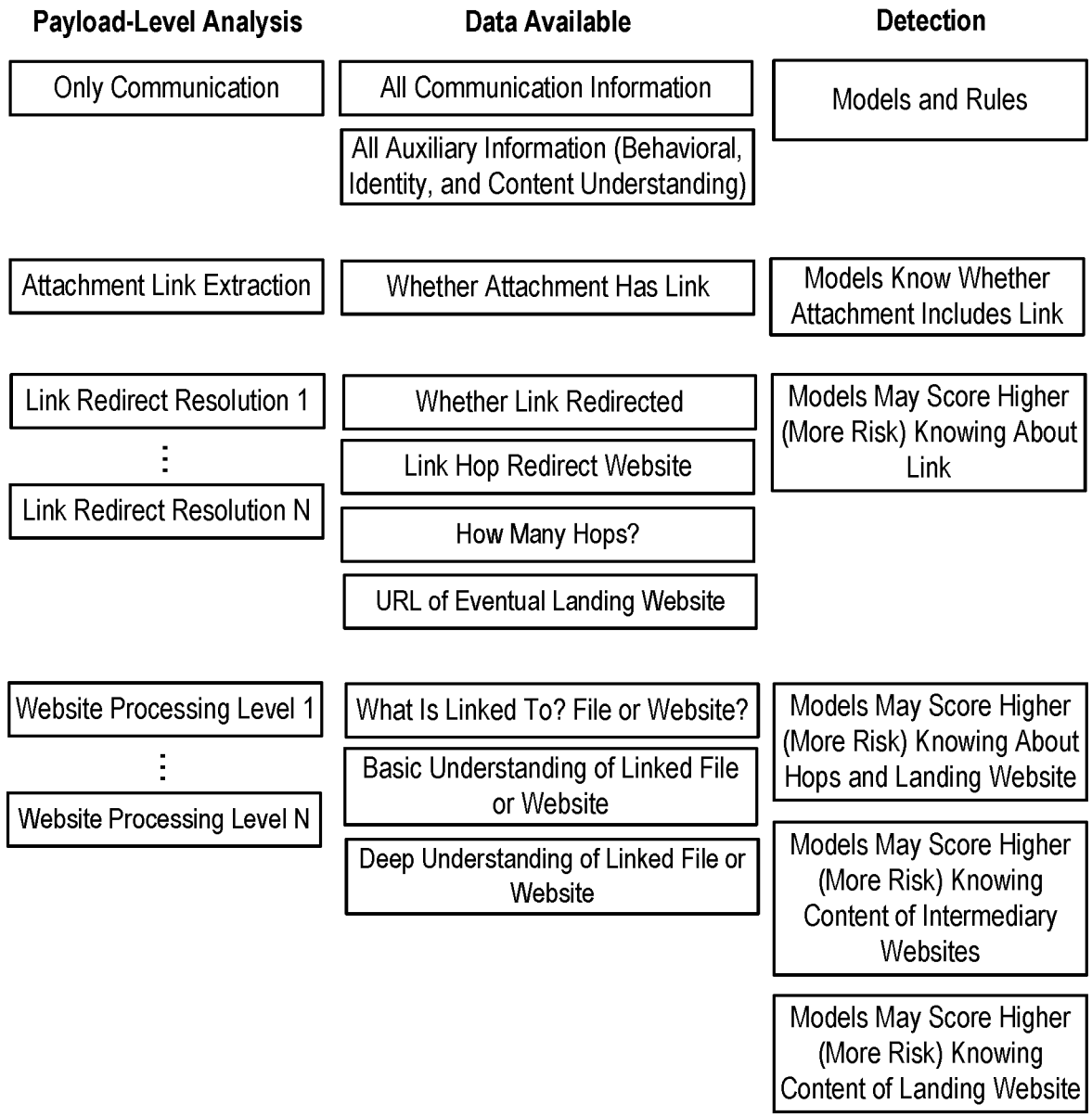
FIG. 5 illustrates examples of how a multi-tiered approach taken by a threat detection platform to ascertain risk can focus primarily on understanding the behavioral context of a communication.

FIG. 5 illustrates examples of how a multi-tiered approach taken by threat detection platform 100 to ascertain risk can focus primarily on understanding the behavioral context of a communication. As threat detection platform 100 processes more information regarding payloads, its models can continue to gain a better understanding of features that are indicative of maliciousness. Threat detection platform 100 (and, more specifically, its models) can thus learn how to identify malicious communications with greater accuracy. For example, threat detection platform 100 can determine whether to score a communication higher (i.e., riskier) based on the presence and content of payloads.

Various pieces of information are shown in FIG. 5. Some of these pieces of information can be extracted, inferred, or otherwise obtained from communications, while other pieces of information can be extracted, inferred, or otherwise obtained from payloads. Moreover, some of these pieces of information may be derived by threat detection platform 100, for example, by applying models to communications or payloads. The following are examples of payload-related features that can be used to discriminate malware:

Behavior features: how often does the user receive (or does the sender send) this type of attachment (HTML, JavaScript, a ZIP file with macros)? Other populations can also be considered, e.g., how often does the Finance department receive (or does the sender send) such attachments? Models can be sensitive to distribution on a per user basis and also to other population groups such as job roles, departments, or organizations (e.g., different companies will have different levels of "rare senders"). Feature crosses can be performed between communication patterns and types of attachment (or other features learned during static analysis of the attachment).

Content features: does an "intent" of the message that is associated with the payload correspond to an attack?

Link features: how rare is the link? (e.g., is it a link to news.yahoo.com (or a whitelisted domain) or 23145j.234wj23.com) Is there an abnormality in the link? (e.g., contains a homoglyph). What is the anchor text accompanying the link? (e.g., "click here" or "sign in to your Wells Fargo account" linking to a non wellsfargo.com domain, both of which are more suspicious than something more verbose, such as "to download our current catalogue, click here," or a link with Wells Fargo anchor text linking to wellsfargo-.com).

Attachment features: how large is the file? Is it a spreadsheet that is empty? Does the file contain macros? How many tabs does the spreadsheet have?

Figure 6:
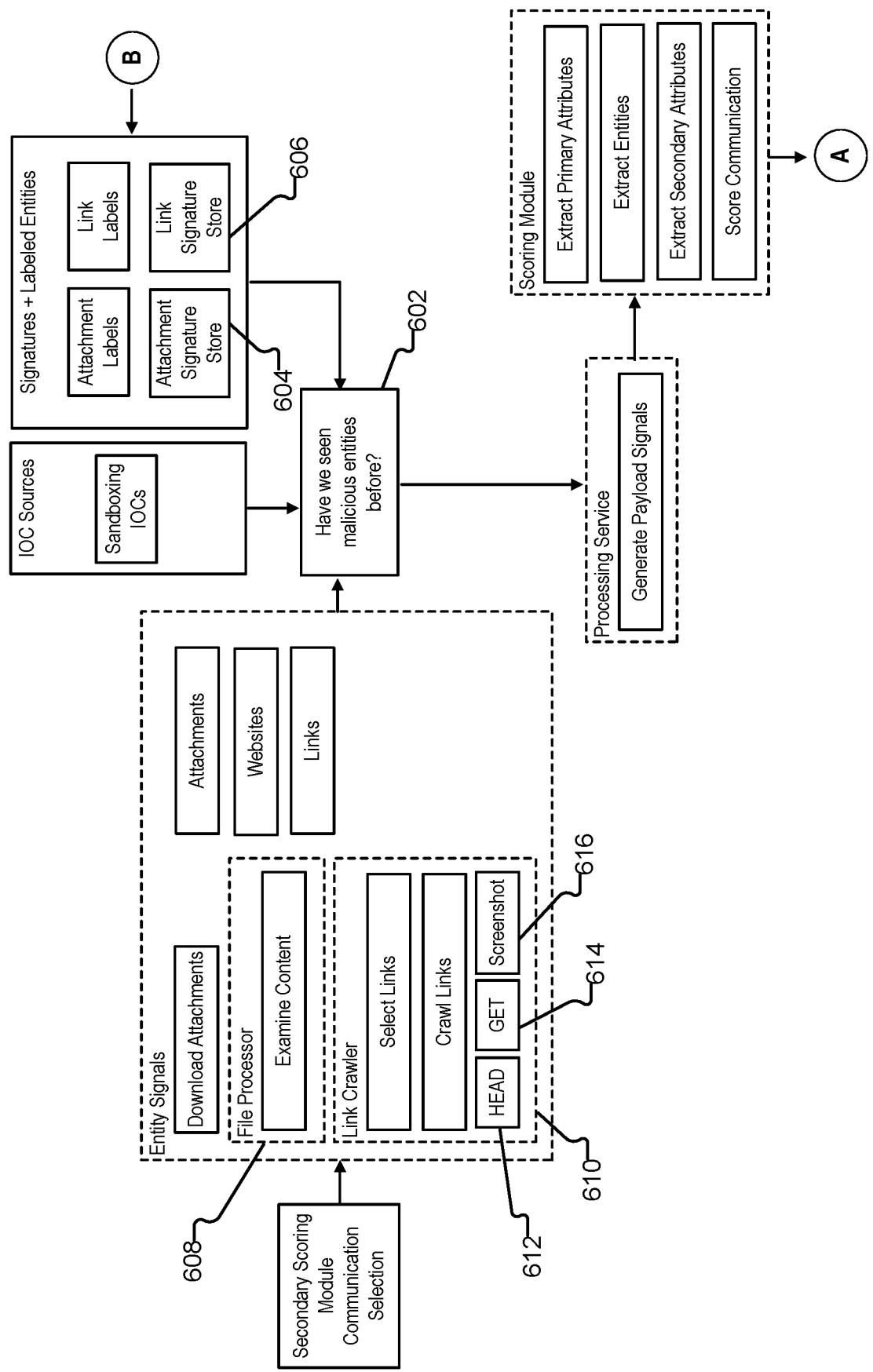
FIG. 6 illustrates an example of how a threat detection platform can leverage payloads known to be malicious.

FIG. 6 illustrates an example of how a threat detection platform can leverage payloads known to be malicious. These payloads are also referred to herein as "known-bad payloads." As shown in FIG. 6, there is a main decision "fork" that seeks to establish whether the threat detection platform has observed the entities of interest before (602). (The term "entity" is generally synonymous with "payload," and thus may be used to refer to attachments or links.) If not, threat detection platform 100 can go through behavioral analysis as discussed above, where additional signals can be fed into models in order to raise or lower scores indicative of risk above or below programmed thresholds.

If threat detection platform 100 does identify a malicious payload through behavioral analysis, this payload can be stored in a storage medium (referred to as a "signature store") for quick access. This signature store can serve as a source for indicators of compromise (IOCs) that can be used for threat research. In some embodiments, threat detection platform 100 maintains separate signature stores for different types of entities. In FIG. 6, for example, the threat detection platform maintains a first signature store for attachments (604) and a second signature store for links (606).

As shown in FIG. 6, threat detection platform 100 can employ a file processor 608 and link crawler 610 to gain insight into attachments and links, respectively. Information extracted from payloads (whether links or attachments) can be used as primary attributes (e.g., "includes a link to a GoogleDoc," "has an attachment of a PDF over 125 k," or "has an attachment that is an Excel document with a macro"). Derived attributes are also referred to herein as secondary attributes. A file processor is a computer program that is designed to systematically browse documents attached to communications to establish, infer, or otherwise obtain information regarding the content of those documents. For example, threat detection platform 100 can employ a file processor to establish whether a document attached to a communication includes any links or forms. Any such attachments can be processed by a file processing service that can perform static analysis on a variety of different types of files (e.g., to further build out a set of features associated with the message).

A variety of policies can be used by threat detection platform 100 in determining whether to perform additional (supplemental) file processing. Generally (e.g., to minimize resource usage), a goal is to only scan files (or portions of files) that could pose security risks. To that end, limits can be placed on file processing at a high level (e.g., for a maximum file size and maximum number of files processed). For a given file type (e.g., PDF, HTML, DOC, XLS, etc.), one approach is to process all such attachments that pass a file size filter criteria. For images (and/or for images included within other filetypes, which can be used, for example, in phishing related attacks), optical character recognition (OCR) can be used. Unfortunately, performing OCR is resource intensive. Policies can be used to specify limits on how much processing is performed (e.g., limiting OCR or other supplemental analysis based on message body length, file size, number of attachments included in a message, etc.). As another example, only the first sheet of a multi-page spreadsheet could be subjected to analysis. Further, such policies can be flexible, e.g., adjusting up or down based on attributes of the message (e.g., with a more suspicious message having a higher size threshold for analysis than a less suspicious message).

A link crawler (also referred to as a "Web crawler") is a computer program that is designed to systematically browse the Internet to establish, infer, or otherwise obtain information about the websites to which links lead. Assume, for example, that threat detection platform 100 discovers that a link is included in either the body or payload of a communication. In such a scenario, threat detection platform 100 can employ a link crawler to establish the landing web site to which the link ultimately leads, whether there are any intermediary websites through which the link crawler is routed before accessing the landing website, etc. Determinations can then be made, for example, about whether the landing page (or a subsequent page) inappropriately solicits credentials (e.g., using topic analysis or other approaches), etc., and any such issues can be imputed to the message (e.g., to flag the message as related to credential phishing). While the attachment and link crawlers perform similar tasks, those normally correspond to separate computer programs that can be individually executed by the threat detection platform.

This approach is beneficial in several respects. As an example, this approach to recording signatures of payloads deemed malicious allows threat detection platform 100 to readily detect malicious payloads through comparison to the signature store. The term "signature" may refer to the payload itself, malicious content (e.g., malware) included in the payload, or information that is extracted or derived from the payload. This approach allows malicious payloads to be discovered more quickly because threat detection platform 100 can autonomously generate signatures without human confirmation. Moreover, these signatures can be shared across a broader community. For example, the signature store may be representative of a federated database that is shared across multiple enterprises. In such a scenario, threat detection platform 100 can generate a signature for a communication directed to an employee of a first enterprise and then use the signature to identify malicious payloads amongst communications directed to a second enterprise.

A variety of policies can be used by threat detection platform 100 in determining whether to crawl links. The following are examples:
  Follow the first link in a message if that link has not been seen before and the message is from a previously unseen sender. (Crawling only the first link, or first few links saves resources over crawling all links.)
  Crawl young domains (e.g., those registered less than 3 months ago).
  Follow links in attachments.
  Follow links that are in a set list (e.g., file sharing domains, redirect domains).
  Do *not* crawl links that have sensitive phrases such as "unsubscribe."
  Do *not* crawl links that have anchor text that may be stateful.

Each of the policies can be applied with different link crawlers that crawl a page in different ways (e.g., HTTP.HEAD (612), HTTP.GET (614), as well as a screen shot service (616) that renders a page in a headless browser and screenshots the page). In some embodiments, each policy defines which crawler(s) to apply and emit an allow, deny, or no decision. Link crawler 610 can be configured to only crawl a particular URL if any applicable policies include at least one "allow" and no "denies." In general, this approach favors crawling links that could be harmful (and thus aspects such as link rarity, domain location, domain age, and anchor text can all be factors), and not crawling links that could be stateful (e.g., inadvertently triggering automatic "unsubscribe" actions by crawling).

As an example, suppose threat detection platform 100 is processing a message that includes three links (A, B, C). Two policies (X, Y) are applicable to the links—specifically, for link crawler HTTP.GET (614), crawling link A is allowed by policy X, crawling link B is allowed by policy X, but crawling link B is denied by policy Y. Crawling link C is not actioned by either policy. In this scenario, link crawler 610 would crawl as follows (based on the policies):
  Link A: [Allow, No action]->crawl
  Link B: [Allow, Deny]->do not crawl
  Link C: [No action, no action]->do not crawl A. Payload Processing A scoring module (e.g., scoring module 108) may work asynchronously in some embodiments—a notification received from an email service or messaging service is queued for processing by a worker node (also referred to as "workers") and then immediately acknowledged. Enqueued notifications are normally processed within seconds of being received, allowing for rapid remediation of malicious communications. When a notification is dequeued, it may be processed serially.

Multithreading of this queue can be problematic in situations where resource-intensive processing is necessary. Restarting the scoring module may result in dropped communications unless the load is shed safely (which may not be possible if the scoring module crashes unexpectedly). Moreover, resource-intensive tasks may prevent enqueuing and acknowledgement of incoming notifications. If the recipient (i.e., the scoring module) of notifications from the email service or messaging service is unresponsive or slow to respond, the service may simply drop the notifications entirely.

Processing payloads, particularly complex attachments, can be an extremely resource-intensive task that can take more than a second to complete. One way to mitigate some of the burden is, instead of examining the payloads of all messages, only examining payloads of messages for which a conclusive verdict (e.g., malicious or benign) can not readily be determined. Such messages can be designated as "candidates" for additional (secondary) processing. To further mitigate the potentially deleterious effects of resource-intensive processing, in some embodiments, threat detection platform 100 offloads tasks to a secondary scoring module as discussed above. Sharing responsibilities among multiple scoring modules not only mitigates the risk of unplanned crashes, but also allows additional functionalities to be readily implemented by the threat detection platform. For example, threat detection platform 100 can perform complex feature analyses beyond payload processing. Some analyses may be network bound (e.g., link crawling), while other analyses may be resource bound (e.g., applying Natural Language Processing and computer vision algorithms). Performing these extractions allows more information to be obtained from a communication. However, performing these extractions serially may dramatically increase the end-to-end processing time for a notification, thereby causing potentially malicious communications to remain in inboxes for longer periods of time (and increasing the risk to employees and enterprises).

Figure 7:
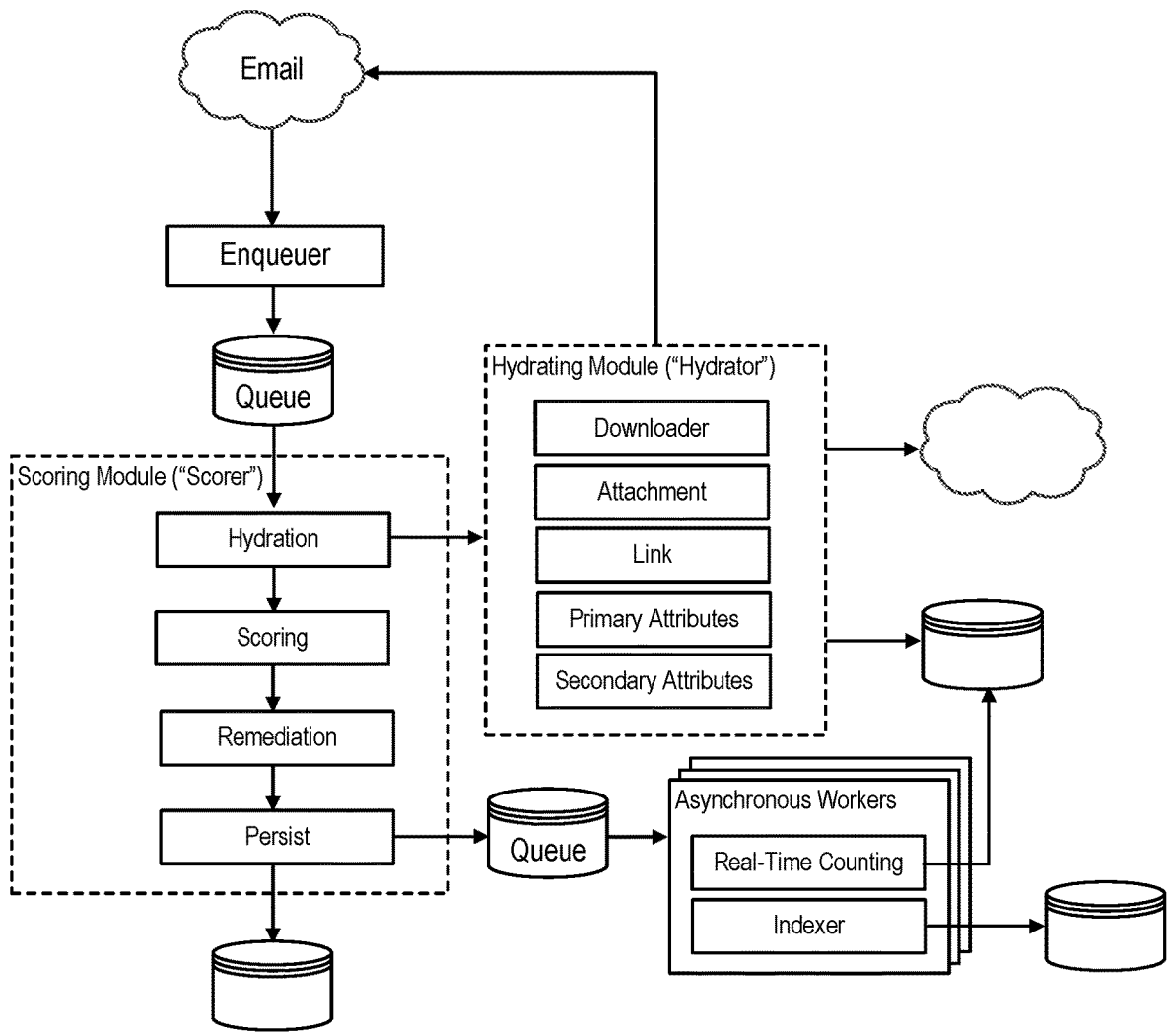
FIG. 7 includes an illustration of an architecture that supports synchronous payload processing for multiple communications.

FIG. 7 includes an illustration of an architecture that supports synchronous payload processing for multiple communications. These communications may be associated with the same employee or different employees (e.g., employed by the same employer or different employers). This architecture is a framework to which new types of extraction functionalities can be added over time.

B. Malware Detection

An important aspect of addressing the threat posed by malware is discovering malware before harm occurs. Threat detection platform 100 can discover malware in communications such that those communications can be remediated (e.g., filtered or deleted) before interaction (potential harm) occurs. To address the threat posed by malware, threat detection platform 100 can perform a variety of actions, including:
  Examine the payload of communications so as to find malware linked in an attack;
  Extract information from the payload;
  Flag communications that contain malware for remediation; and
  Classify communications containing malware for analysis or explanation purposes.

Classifications can be very important when conveying the threat posed by the malware, as well as producing metrics that quantify the threat posed by a given email, the threat faced by a given enterprise, or the performance of the threat detection platform.

Figure 8:
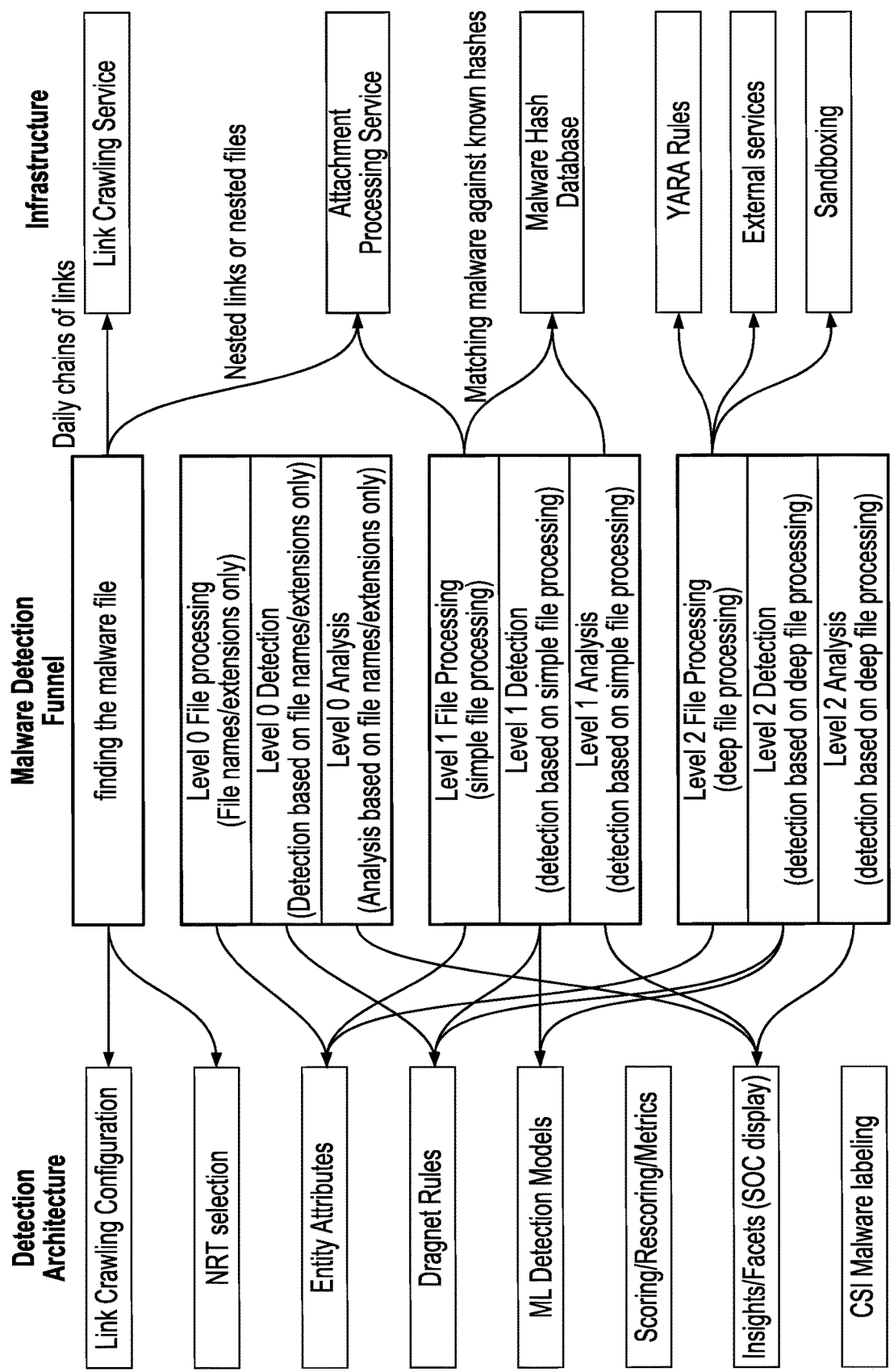
FIG. 8 illustrates an out-of-band batch analysis workstream for detecting malware in communications.

FIG. 8 illustrates an out-of-band batch analysis workstream for detecting malware in communications. At a high level, this workstream is representative of a series of stages that act as a funnel for handling communications. Initially, threat detection platform 100 can locate the malware that is contained in, or linked to by, a communication. For example, the threat detection platform may need to follow links or open attachments as discussed above. In this stage, the threat detection platform can establish how the recipient was expected to access the malware, which may be helpful in detection of future attacks. For example, if the threat detection platform discovers that a communication includes a link to a Google Drive folder in which malware is maintained, that information can be used to protect against similar attacks in the future. For convenience, the other stages are numerically labeled (i.e., "Level 0," "Level 1," "Level 2").

In Level 0, threat detection platform 100 may extract features from the names or extensions of files, as well as other data that is available at that time, such as communication features, features specifying how the file was linked, etc. Then, threat detection platform 100 may attempt to determine whether the communication is representative of a malware message purely from the data available at Level 0. Moreover, threat detection platform 100 may provide metrics regarding the malware and malware facet classification, again based solely on the data at Level 0.

In Level 1, threat detection platform 100 may extract features from the contents of files using "lightweight" models (e.g., no external services or sandboxing). The threat detection platform can then determine whether the communication is representative of malware purely from the data available at Level 1. The threat detection platform may also provide metrics regarding the malware and malware facet classification based on the features extracted from the file itself. Examples of such features include "contains executable code" and "has a password-protected file."

In Level 2, the threat detection platform may process the file more deeply using external services or sandboxing. Again, the threat detection platform may determine whether the communication is representative of a malware purely from the data available at Level 1, as well as provide metrics regarding the malware and malware facet classification based on the features surfaced by the external services or sandboxing. For example, with these features, the threat detection platform may be able to identify the type of malware contained in the communication.

C. Quantifying Risk

Payload-based malware can be destructive for enterprises. As ransomware attacks become more prevalent, attackers are expanding their reach and increasing their chances of success. To protect against malware, a threat detection platform can use a behavioral analysis approach as discussed above. More specifically, the threat detection platform can use anomalous signals in combination with payload analysis to detect threats. Such an approach not only allows threats to be detected in near real time, but also allows SOC analysts to be informed of threats while providing context for those threats.

As discussed above, real-time protective services (e.g., scoring, adjudicating, and remediating) may be performed by separate but related modules: a primary scoring module (also referred to as the "real-time (RT) scorer") and a secondary scoring module (also referred to as the "near-real-time (NRT) scorer"). These modules may differ in the expectations placed upon them. The primary scoring module may be expected to respond quickly (e.g., within a second) with a determination of maliciousness followed by immediate remediation if necessary. By necessity, the primary scoring module may limit the analysis that it performs, both in terms of the processing time and data required. Meanwhile, the secondary scoring module may be allowed more time to make its decision, which allows it to do "heavier" analysis that takes more time and/or uses more data.

Accordingly, on a per-communication basis, the secondary scoring module may "cost" more than the primary scoring module in terms of computing resources. For example, the secondary scoring module may obtain more data (e.g., by making more API calls) and apply "heavier" models that consume more computing resources. To control these costs, the secondary scoring module may be applied to a subset of incoming communications. As discussed above, communications that have been determined to be clearly malicious or non-malicious by the primary scoring module may not require additional confirmation by the secondary scoring module.

To ensure that the appropriate communications are forwarded to the secondary scoring module for further analysis, in some embodiments, a candidate selection module is run over email messages and produces a decision on whether the message should be selected for supplemental processing. This module can be defined in the form of selection rules (or simply "rules") and/or a machine learning model trained to identify messages that need additional processing. Rules may be automatically defined by the threat detection platform, or these rules may be manually defined by an individual (e.g., through an interface generated by the threat detection platform). For each rule, the threat detection platform can populate appropriate criteria in a data structure to be stored in a database. This database can be formatted so that rules can be easily added, edited, deleted, and disabled. Moreover, this database can be formatted so that the threat detection platform can track performance so as to have full awareness of how the rules are being implemented by the secondary scoring module. The machine learning model can also be applied as a rule where the rule states that a message with a model score above a particular threshold should be sent to the secondary scoring module. In some embodiments, mistakes made by the secondary scoring module are recoverable. For example, the secondary scoring module may be able to recall a communication after inadvertently not scoring the communication despite it being deemed a candidate for further review by the primary scoring module.

One way to accomplish this is by programming the primary scoring module to produce a notification for each communication that is processed. These notifications may be stored in temporal order in a queue, and the secondary scoring module can apply a record filter to the queue that identifies which communications are to be processed.

V. Example Process

Figure 9:
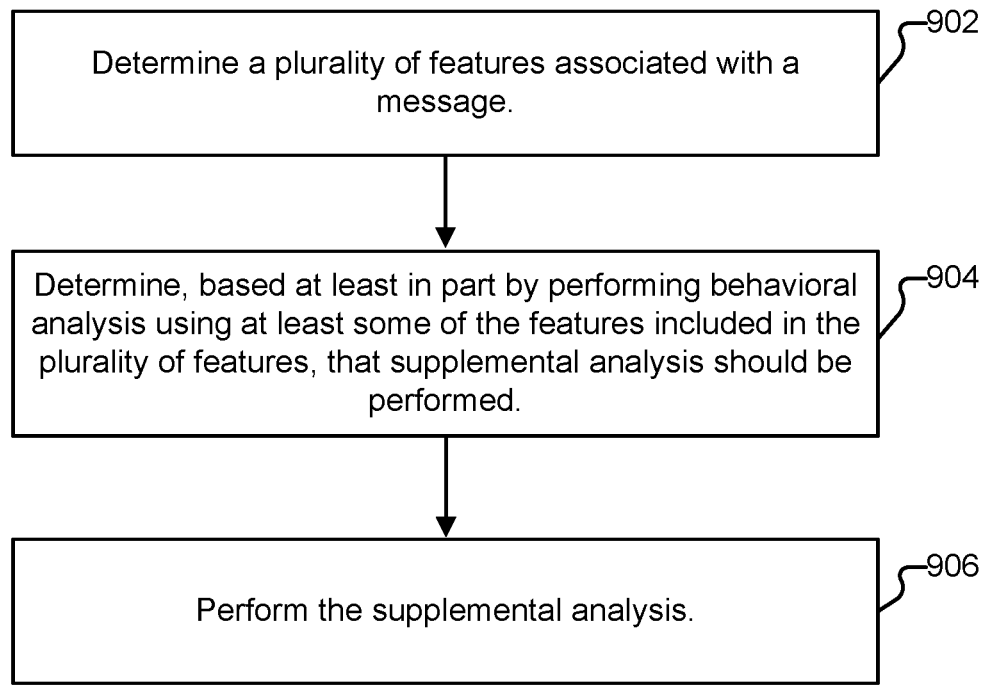
FIG. 9 illustrates an example of a process for a multi-tiered approach to payload detection.

FIG. 9 illustrates an example of a process for a multi-tiered approach to payload detection. In various embodiments, process 900 is performed by a threat detection platform, such as threat detection platform 100. The process begins at 902 when a plurality of features associated with a message is determined. As one example, at 902, threat detection platform 100 accesses an electronic message store (e.g., in response to an indication provided by an API) that one or more unprocessed messages are present for a user. Feature extraction is performed on one such message to obtain, for example, the body text, subject text, payload features (e.g., attachments and/or links), behavioral features, etc. At 904, a determination is made, based at least in part on behavioral analysis, that supplemental analysis should be performed (i.e., the message is a candidate for supplemental analysis). As previously discussed, the behavioral analysis can be used to determine if one or more aspects of a particular message indicate it is sufficiently abnormal from a behavioral perspective to be deemed potentially risky. As one example, "is the sender of the message someone who routinely communicates with the recipient" (e.g., a co-worker) or a "rare/previously-unseen sender." As another example, even where the sender is in frequent communication with the recipient, is another aspect (or set of aspects) of the message abnormal (e.g., the sender has not historically sent attachments, the sender has historically sent Microsoft Word documents not Microsoft Excel documents, etc.).

At 906, supplemental analysis is performed in response to the determination made at 904. As applicable, an appropriate remedial action can be taken in response to a result of the supplemental analysis. As an example, and as described above, if a payload (a link or an attachment) is determined to be suspicious during the supplemental analysis performed at 906, this information coupled with a previous determination of a suspicious nature of the message (using behavioral analysis) can be used to quarantine or otherwise neutralize a threat likely posed by the message.

VI. Example Processing System

Figure 10:
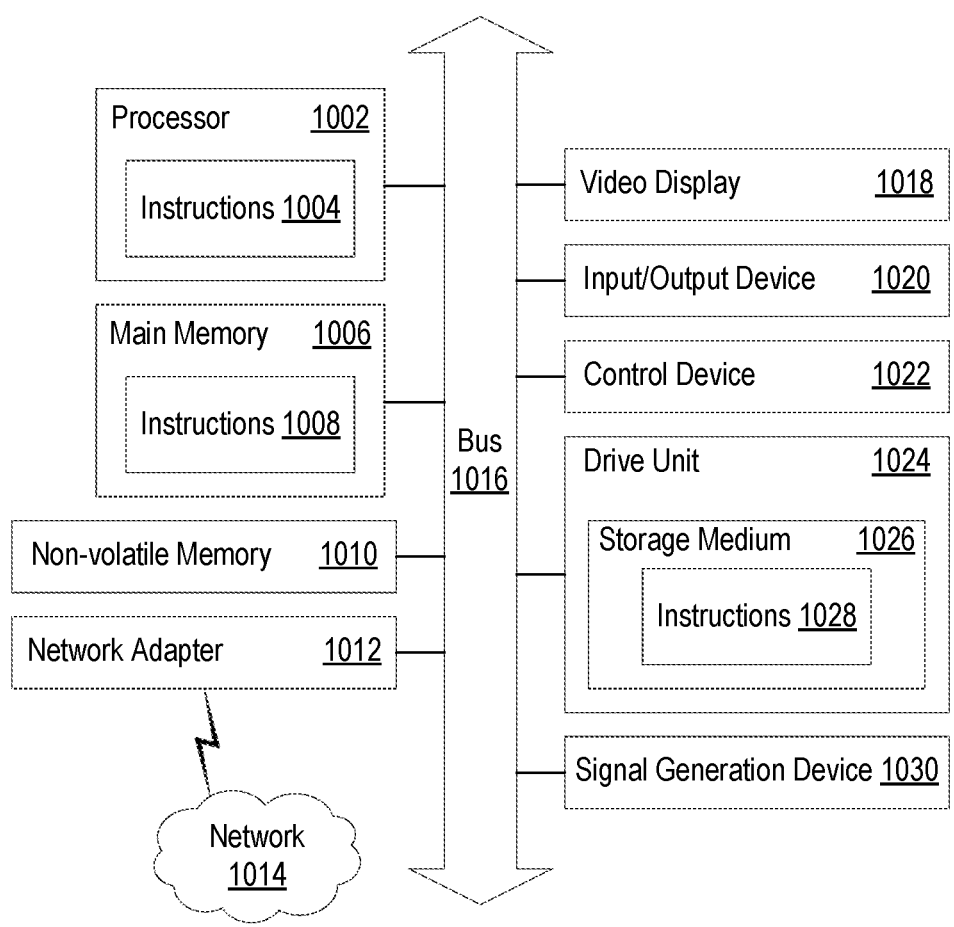
FIG. 10 is a block diagram illustrating an example of a processing system in which at least some operations described herein can be implemented.

FIG. 10 is a block diagram illustrating an example of a processing system 1000 in which at least some operations described herein can be implemented. For example, components of the processing system 1000 can be hosted on one or more electronic devices used to provide a threat detection platform (e.g., threat detection platform 100 of FIG. 1).

Processing system 1000 includes a processor 1002, main memory 1006, non-volatile memory 1010, network adapter 1012, video display 1018, input/output device 1020, control device 1022 (e.g., a keyboard, pointing device, or mechanical input such as a button), drive unit 1024 that includes a storage medium 1026, and signal generation device 1030 that are communicatively connected to a bus 1016. Bus 1016 is illustrated as an abstraction that represents one or more physical buses and/or point-to-point connections that are connected by appropriate bridges, adapters, or controllers. Bus 1016, therefore, can include a system bus, Peripheral Component Interconnect (PCI) bus, PCI-Express bus, HyperTransport bus, Industry Standard Architecture (ISA) bus, Small Computer System Interface (SCSI) bus, Universal Serial Bus (USB), Inter-Integrated Circuit (I2C) bus, and/or a bus compliant with Institute of Electrical and Electronics Engineers (IEEE) Standard 1394, etc.

Processing system 1000 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 800.

While the main memory 1006, non-volatile memory 1010, and storage medium 1026 are shown to be a single medium, the terms "storage medium" and "machine-readable medium" should be taken to include a single medium or multiple media that store one or more sets of instructions 1028. The terms "storage medium" and "machine-readable medium" should also be taken to include any medium that is capable of storing, encoding, or carrying a set of instructions for execution by the processing system 1000. Further examples of machine- and computer-readable media include recordable-type media such as volatile and non-volatile memory devices 1010, removable disks, hard disk drives, optical disks (e.g., Compact Disk Read-Only Memory (CD-ROMS) and Digital Versatile Disks (DVDs)), cloud-based storage, and transmission-type media such as digital and analog communication links.

In general, the routines executed to implement embodiments described herein can be implemented as part of an operating system or a specific application, component, program, object, module, or sequence of instructions (collectively referred to as "computer programs"). The computer programs typically comprise one or more instructions (e.g., instructions 1004, 1008, 1028) set at various times in various memories and storage devices in an electronic device. When read and executed by the processor 1002, the instructions cause the processing system 1000 to perform operations to execute various aspects of techniques described herein.

Network adapter 1012 allows processing system 1000 to mediate data in a network 1014 with an entity that is external to the processing system 1000 through any communication protocol supported by the processing system 1000 and the external entity. Examples of network adapter 1012 include a network adaptor card, a wireless network interface card, a switch, a protocol converter, a gateway, a bridge, a hub, a receiver, a repeater, or a transceiver that includes an integrated circuit (e.g., enabling communication over Bluetooth or Wi-Fi), etc.

Techniques introduced herein can be implemented using software, firmware, hardware, or a combination of such forms. For example, various aspects can be implemented using special-purpose hardwired (i.e., non-programmable) circuitry in the form of application-specific integrated circuits (ASICs), programmable logic devices (PLDs), field-programmable gate arrays (FPGAs), and the like.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
determine a plurality of features associated with a message, wherein at least one feature included in the plurality of features is associated with a payload of the message, wherein the payload comprises at least one link;
determine, based at least in part by a primary scoring module performing behavioral analysis using at least some of the features included in the plurality of features, that a threat potentially posed by the message is neither definitively malicious or definitively benign, and in response flag the message as a candidate for supplemental analysis offloaded to a secondary scoring module; and
perform, by the secondary scoring module, the supplemental analysis, including by performing payload analysis comprising determining, from a set of links, a subset of links upon which to perform link analysis; and
a memory coupled to the processor and configured to provide the processor with instructions.

2. The system of claim 1, wherein the processor is further configured to retrieve the message by establishing, via an application programming interface (API), a connection with a storage medium that includes a series of communications received by an employee of an enterprise.

3. The system of claim 1, wherein performing the behavioral analysis includes evaluating content for a deviation from a history.

4. The system of claim 3, wherein performing the behavioral analysis includes determining that a sender has deviated from a historical profile.

5. The system of claim 3, wherein performing the behavioral analysis includes determining that receipt of the message by a recipient deviates from a historical profile.

6. The system of claim 1, wherein performing the payload analysis includes performing file analysis on an attachment.

7. The system of claim 6, wherein performing the payload analysis includes unzipping the attachment.

8. The system of claim 6, wherein performing the payload analysis includes determining whether a macro is present in the attachment.

9. The system of claim 6, wherein performing the payload analysis includes preferentially evaluating a first sheet of a spreadsheet.

10. The system of claim 6, wherein performing the payload analysis includes performing Optical Character Recognition on at least a portion of the attachment.

11. The system of claim 10, wherein the portion comprises a first page of a multi-page document.

12. The system of claim 1, wherein the processor is further configured to perform link analysis, including by determining whether a link included in the message comprises an unsubscribe link.

13. The system of claim 1, wherein the processor is further configured to perform link analysis, including by parsing anchor text.

14. The system of claim 1, wherein the processor is further configured to perform link analysis, including by establishing a path to a file download.

15. A method, comprising:
   determining a plurality of features associated with a message, wherein at least one feature included in the plurality of features is associated with a payload of the message, wherein the payload comprises at least one link;
   determining, based at least in part by a primary scoring module performing behavioral analysis using at least some of the features included in the plurality of features, that a threat potentially posed by the message is neither definitively malicious or definitively benign, and in response flag the message as a candidate for supplemental analysis offloaded to a secondary scoring module; and
   performing, by the secondary scoring module, the supplemental analysis, including by performing payload analysis comprising determining, from a set of links, a subset of links upon which to perform link analysis.

16. A computer program product embodied in a non-transitory computer readable medium and comprising computer instructions for:
   determining a plurality of features associated with a message, wherein at least one feature included in the plurality of features is associated with a payload of the message, wherein the payload comprises at least one link;
   determining, based at least in part by a primary scoring module performing behavioral analysis using at least some of the features included in the plurality of features, that a threat potentially posed by the message is neither definitively malicious or definitively benign, and in response flag the message as a candidate for supplemental analysis offloaded to a secondary scoring module; and
   performing, by the secondary scoring module, the supplemental analysis, including by performing payload analysis comprising determining, from a set of links, a subset of links upon which to perform link analysis.

17. The method of claim 15, further comprising retrieving the message by establishing, via an application programming interface (API), a connection with a storage medium that includes a series of communications received by an employee of an enterprise.

18. The method of claim 15, wherein performing the behavioral analysis includes evaluating content for a deviation from a history.

19. The method of claim 18, wherein performing the behavioral analysis includes determining that a sender has deviated from a historical profile.

20. The method of claim 18, wherein performing the behavioral analysis includes determining that receipt of the message by a recipient deviates from a historical profile.

21. The method of claim 15, wherein performing the payload analysis includes performing file analysis on an attachment.

22. The method of claim 21, wherein performing the payload analysis includes unzipping the attachment.

23. The method of claim 21, wherein performing the payload analysis includes determining whether a macro is present in the attachment.

24. The method of claim 21, wherein performing the payload analysis includes preferentially evaluating a first sheet of a spreadsheet.

25. The method of claim 21, wherein performing the payload analysis includes performing Optical Character Recognition on at least a portion of the attachment.

26. The method of claim 25, wherein the portion comprises a first page of a multi-page document.

27. The method of claim 15, further comprising performing link analysis including by determining whether a link included in the message comprises an unsubscribe link.

28. The method of claim 15, further comprising performing link analysis including by parsing anchor text.

29. The method of claim 15, further comprising performing link analysis including by establishing a path to a file download.

* * * * *